US012201999B2

(12) United States Patent
Lee

(10) Patent No.: US 12,201,999 B2
(45) **Date of Patent: *Jan. 21, 2025**

(54) SHOWER SYSTEM INCLUDING MAGNETIC HANDSHOWER DOCKING

(71) Applicant: Delta Faucet Company, Indianapolis, IN (US)

(72) Inventor: David Lee, Westfield, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,278

(22) Filed: Oct. 20, 2023

(65) Prior Publication Data

US 2024/0042476 A1 Feb. 8, 2024

Related U.S. Application Data

(62) Division of application No. 16/999,692, filed on Aug. 21, 2020, now Pat. No. 11,826,769.

(60) Provisional application No. 62/894,275, filed on Aug. 30, 2019.

(51) Int. Cl.

| | |
|---|---|
| ***B05B 15/62*** | (2018.01) |
| ***B05B 1/18*** | (2006.01) |
| ***E03C 1/06*** | (2006.01) |

(52) U.S. Cl.

CPC ................ *B05B 15/62* (2018.02); *B05B 1/18* (2013.01); *E03C 1/06* (2013.01)

(58) Field of Classification Search

CPC .............. B05B 15/62; B05B 1/18; E03C 1/06

USPC ....... 239/273, 275, 279, 282, 283, 548, 556, 239/567, DIG. 11

See application file for complete search history.

(56) References Cited

U.S. PATENT DOCUMENTS

| | | | |
|---|---|---|---|
| 6,446,278 | B1 | 9/2002 | Lin |
| 6,594,832 | B2 | 7/2003 | Yang |
| 8,205,846 | B2 | 6/2012 | Glunk |
| 8,496,028 | B2 | 7/2013 | Nelson et al. |
| 9,095,862 | B2 | 8/2015 | Hanna et al. |
| 9,438,977 | B2 | 9/2016 | Wang et al. |
| 9,587,383 | B2 | 3/2017 | Wu et al. |
| 9,822,512 | B2 | 11/2017 | Chan |
| 9,828,752 | B2 | 11/2017 | Genord et al. |
| 9,855,568 | B2 | 1/2018 | Hawkins |
| 9,919,331 | B2 | 3/2018 | Scheffer et al. |
| 9,943,863 | B2 | 4/2018 | Huffington et al. |

(Continued)

FOREIGN PATENT DOCUMENTS

| | | |
|---|---|---|
| CN | 202343352 | 7/2012 |
| CN | 102873000 | 1/2013 |

(Continued)

OTHER PUBLICATIONS

Kohler Converge Vibrant Brushed Nickel 5-Spray Dual Shower Head, retrieved from https://www.lowes.com/pd/KOHLER-Converge-Vibrant-Brushed-Nickel-5-Spray-Dual-Shower-Head/1000183037 on Aug. 19, 2019, 6 pages.

(Continued)

*Primary Examiner* — Christopher S Kim

(74) *Attorney, Agent, or Firm* — Bose McKinney & Evans LLP

(57) ABSTRACT

A shower system including a mount, a moveable handshower, and a magnetic coupler between the mount and the handshower.

13 Claims, 20 Drawing Sheets

(56) References Cited

U.S. PATENT DOCUMENTS

| | | | |
|---|---|---|---|
| 10,017,923 | B2 | 7/2018 | Genord et al. |
| 10,046,341 | B2 | 8/2018 | Wu et al. |
| 10,150,121 | B2 | 12/2018 | Lin et al. |
| 10,537,904 | B2 | 1/2020 | Lin et al. |
| 10,618,065 | B2 | 4/2020 | Lin et al. |
| 11,826,769 | B2 * | 11/2023 | Lee ........................... B05B 1/18 |
| 2007/0022528 | A1 | 2/2007 | Gilbert |
| 2009/0007330 | A1 | 1/2009 | Genord et al. |
| 2010/0043135 | A1 | 2/2010 | Patterson et al. |
| 2013/0299608 | A1 | 11/2013 | Spangler et al. |
| 2013/0320116 | A1 | 12/2013 | Jonte et al. |
| 2016/0325292 | A1 | 11/2016 | Hawkins |
| 2017/0014849 | A1 | 1/2017 | Gao et al. |
| 2018/0193851 | A1 | 7/2018 | L'Hernaff et al. |
| 2018/0291601 | A1 | 10/2018 | Genord et al. |
| 2018/0339300 | A1 | 11/2018 | Lin et al. |
| 2019/0083991 | A1 | 3/2019 | Lin et al. |
| 2019/0091715 | A1 | 3/2019 | Mercado |
| 2019/0142147 | A1 | 5/2019 | Quinn et al. |
| 2019/0176170 | A1 | 6/2019 | Lee et al. |

FOREIGN PATENT DOCUMENTS

| | | |
|---|---|---|
| CN | 203470251 | 3/2014 |
| WO | 2008107103 | 9/2008 |

OTHER PUBLICATIONS

Moen Magnetix Handheld Showers, retrieved from https:///www.moen.com/magnetix on Aug. 19, 2019, 15 pages.

* cited by examiner 112
342
318
66
50
314
310
170
18
318
342

112
340
318
50
314
18
310
66
170
318
340

112
170
318
316
314
310
20
18
318
352

SHOWER SYSTEM INCLUDING MAGNETIC HANDSHOWER DOCKING

CROSS-REFERENCE TO RELATED APPLICATION

The present application is a divisional of U.S. patent application Ser. No. 16/999,692, filed Aug. 21, 2020, which claims priority to U.S. Provisional Patent Application Ser. No. 62/894,275, filed Aug. 30, 2019, the disclosures of which are expressly incorporated herein by reference.

BACKGROUND AND SUMMARY OF THE DISCLOSURE

The present disclosure relates generally to a shower system and, more particularly, to a coupler for securing a moveable handshower to a mount.

As known, a bathing area frequently includes a shower system. Discharging water through apertures in a showerhead of the shower system generates a showering spray of water within the bathing area. Adjusting the position of the showerhead may adjust the spray of water. Adjustments may include changing the size of the apertures and/or the water flow through the showerhead.

Some conventional shower systems include a handheld showerhead or handshower, which can direct a spray of water separate from a spray of water emitting from a fixed overhead showerhead. The handshower may be moveably mounted or docked to another portion of the shower assembly. A user undocks and removes the handshower within the bathing area to change the direction and location of the spray of water. Some shower systems may deliver water to the bathing area selectively through the overhead showerhead and/or the handshower.

Magnetic couplings for handshowers are known in the art. However, there remains a need for a retention device for docking a handshower that supplements a magnetic docking to prevent inadvertent undocking of the handshower from the mount, for example, due to bumping of the connected shower hose. Further, there remains a need for easy, reliable docking of a handshower to a mount while having the convenience of a magnetically attracted mount, while also providing for easy, reliable undocking.

According to an illustrative embodiment of the present disclosure, a shower system includes a mount having a body, and a magnet supported by the body. A handshower includes a housing, a sprayface supported by a front portion of the housing, and a magnetically attractive member supported by a rear portion of the housing. A retainer is supported by one of the body of the mount and the housing of the handshower, the retainer having a retaining lip defining a retaining slot. A mounting tab is supported by the other of the housing of the handshower and the body of the mount. The handshower is in spaced relation to the mount in an undocked mode. The magnet is magnetically coupled to the magnetically attractive member, and the magnet is received within the retaining slot in a docked mode. Illustratively, the retainer is supported by a front portion of the body of the mount in spaced relation to the magnet, and the mounting tab is supported by the rear portion of the housing of the handshower in spaced relation to the magnetically attractive member.

According to another illustrative embodiment of the present disclosure, a shower system includes a mount having a body, and a magnet supported by the body. A handshower includes a housing, a sprayface supported by a front portion of the housing, and a magnetically attractive member supported by a rear portion of the housing. A retainer is supported by one of the body of the mount and the housing of the handshower, the retainer having a retaining lip defining a slot, wherein the retaining lip is defined by a pair of opposing clips. A mounting tab is supported by the other one of the housing of the handshower and the body of the mount. The mounting tab includes a pair of opposing arms having angled surfaces configured to bias the opposing arms outwardly away from each other. The handshower is in spaced relation to the mount in an undocked mode. The magnet is magnetically coupled to the magnetically attractive member, and the mounting tab is received within the retaining slot in a docked mode. Illustratively, the retainer is supported by a front portion of the body of the mount in spaced relation to the magnet, and the mounting tab is supported by the rear portion of the housing of the handshower in spaced relation to the magnetically attractive member.

According to another illustrative embodiment of the present disclosure, a shower system includes a mount having a body, and a magnet supported by the body. A handshower includes housing, a sprayface supported by a front portion of the housing, and a magnetically attractive member supported by a rear portion of the housing. A retainer is supported by one of the body of the mount and the housing of the handshower, the retainer having a retaining lip defining a retaining slot. A mounting tab is supported by the other one of the housing of the handshower and the body of the mount. The retaining lip of the retainer includes a recess to define a receiver for receiving the mounting tab. The handshower is in spaced relation to the mount in an undocked mode. The magnet is magnetically coupled to the magnetically attractive member, and the mounting tab is received within the retaining slot in a docked mode. A center of the magnet of the mount is offset from a center of the receiver of the mount. Illustratively, the retainer is supported by a front portion of the body of the mount in spaced relation to the magnet, and the mounting tab is supported by the rear portion of the housing of the handshower in spaced relation to the magnetically attractive member.

According to a further illustrative embodiment of the present disclosure, a shower system includes a mount having a body, and a handshower including a housing, and a sprayface supported by a front portion of the housing. A magnetic coupling includes a magnet supported by one of the body of the mount and the housing of the handshower, and a magnetically attractive member supported by the other of the housing of the handshower and the body of the mount. A retaining device includes a retainer supported by one of the mount and the handshower, the retainer having a retaining lip defining a retaining slot, and a mounting tab supported by the other of the handshower and the mount. The handshower is in spaced relation to the mount in an undocked mode. The magnet is magnetically coupled to the magnetically attractive member, and the mounting tab is received within the retaining slot in a docked mode.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
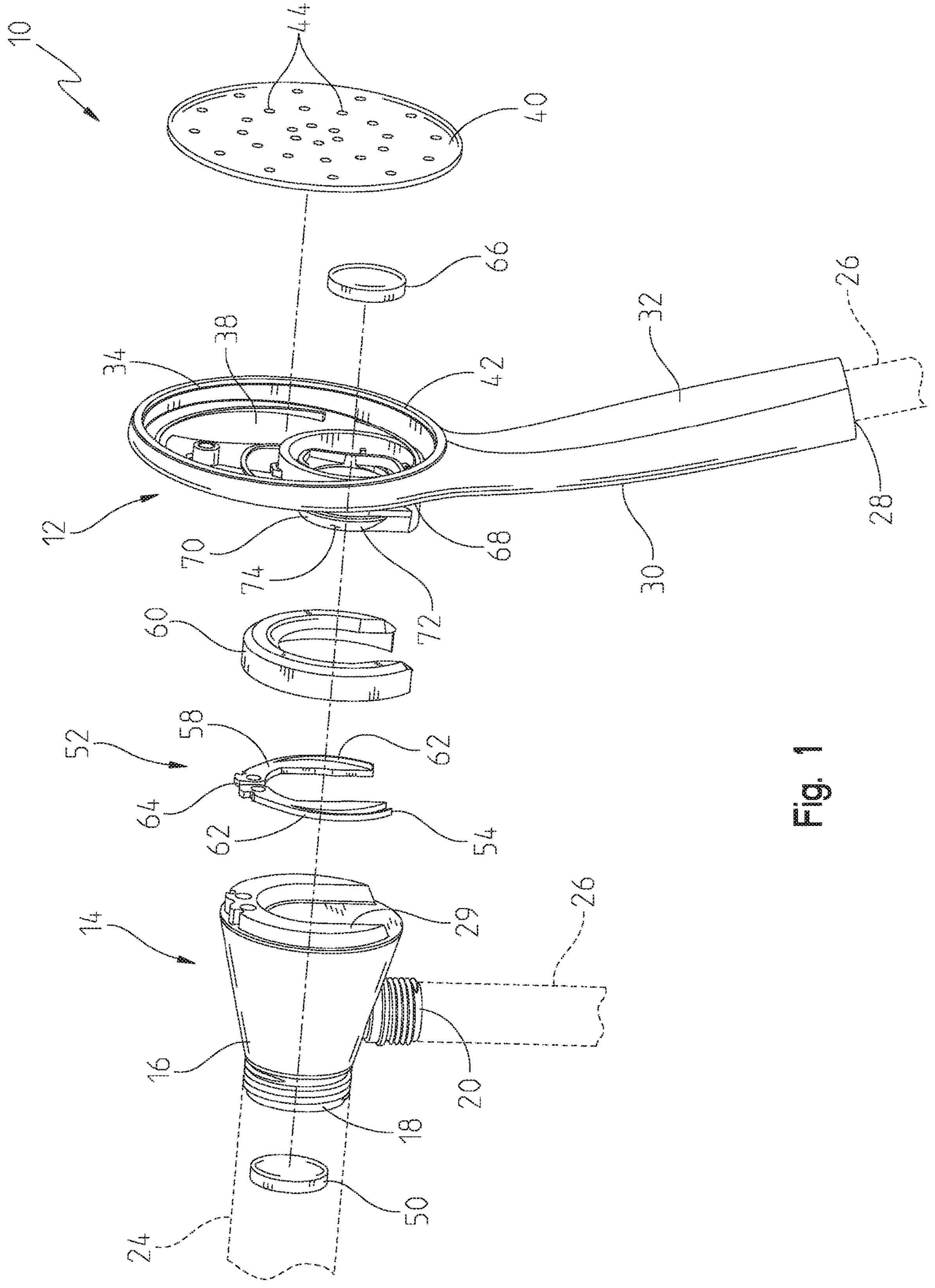
FIG. 1 is a partially exploded perspective view of an illustrative shower system of the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 2:
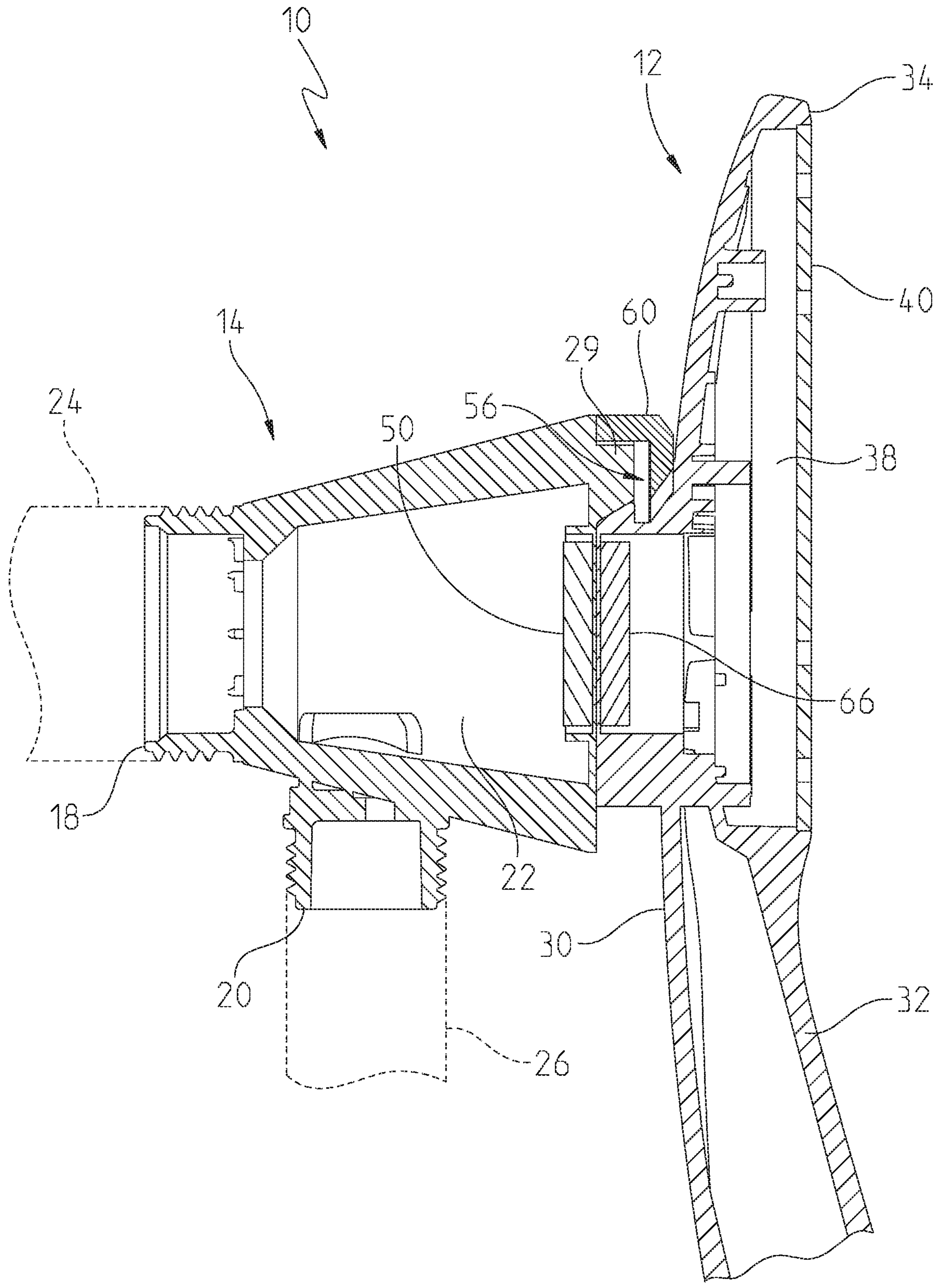
FIG. 2 is a cross-sectional view of the shower system of FIG. 1.
Figure 3:
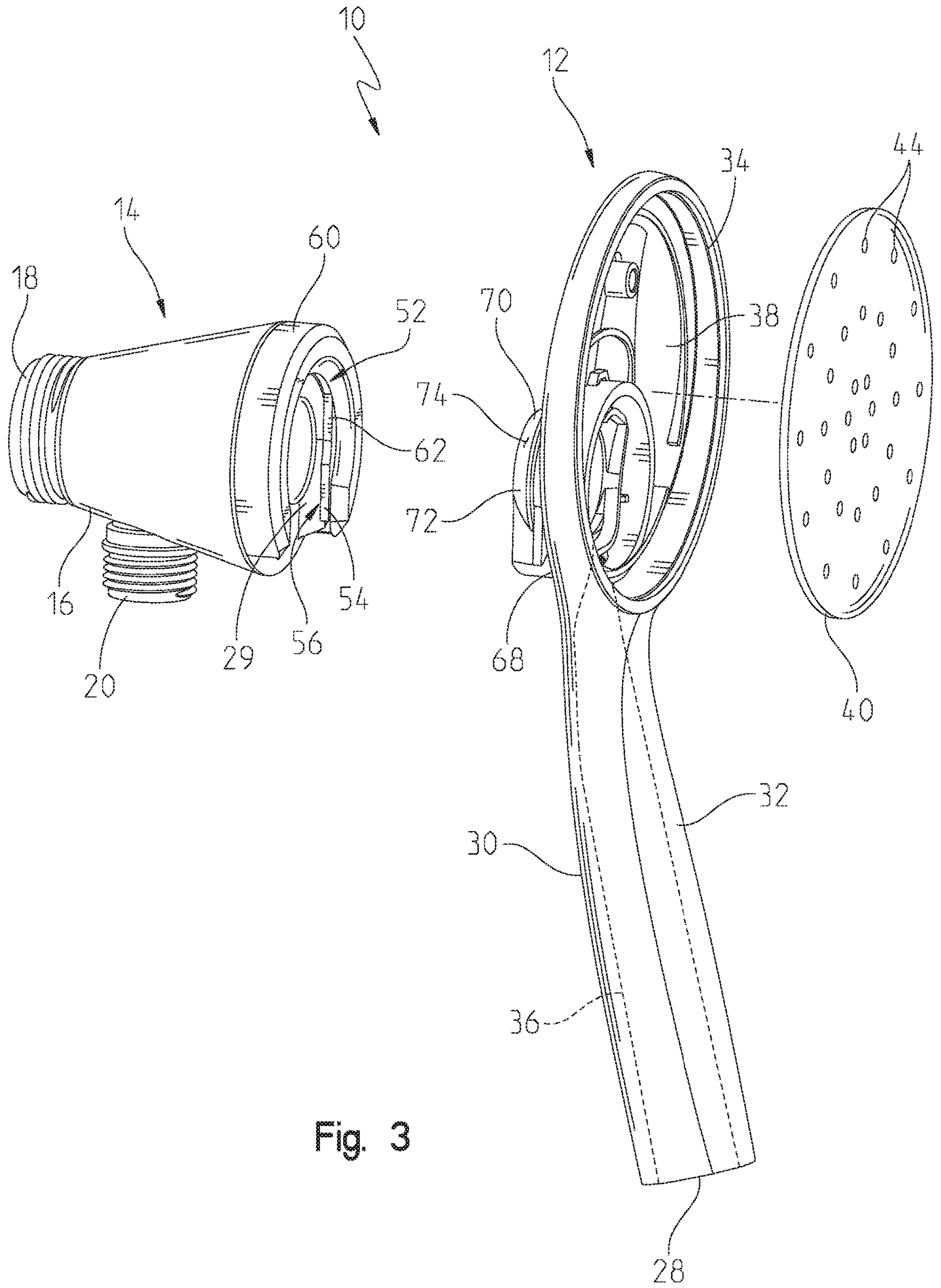
FIG. 3 is a partially exploded perspective view of the shower system of FIG. 1, showing the handshower uncoupled from the mount.

Referring initially to FIGS. 1-3, an illustrative shower system 10 includes a handheld showerhead or handshower 12 removably coupled to a mount 14 supported by a vertical shower wall (not shown). A water supply provides water to the movable handshower 12 illustratively through the mount 14 via a water control valve (not shown). More particularly, the mount 14 illustratively includes a body 16 defining an inlet 18 in fluid communication with an outlet 20 via a connecting passageway or chamber 22. The inlet 18 is illustratively coupled to a conventional shower arm 24, and a flexible hose 26 illustratively couples the outlet 20 to an inlet 28 of the handshower 12. A support or seat, illustratively a U-shaped projection 29, extends outwardly from the body 16 opposite the inlet 18. In certain illustrative embodiments, the mount 14 may include a fixed showerhead (not shown) for dispensing water and/or a diverter valve (not shown) to selectively control water flow to the handshower 12 and/or the fixed showerhead.

The handshower 12 illustratively includes a housing 30 having a handle 32 operably coupled to a sprayhead 34. The inlet 28 is illustratively defined by the handle 32. A passageway 36 provides fluid communication between the inlet 28 and a chamber 38 defined by the sprayhead 34. A sprayface 40 is illustratively coupled to a front portion 42 of the sprayhead 34 and includes plurality of apertures 44 for dispersing water from the chamber 38 (FIG. 1).

The mount 14 illustratively includes a first magnetically attractive member 50 supported by the body 16. Illustratively, the first magnetically attractive member 50 is a first magnet. A retainer 52 is also illustratively supported by a front portion of the body 16 and is positioned in spaced relation to the magnet 50. The illustrative retainer 52 includes a retaining lip 54 defining a retaining slot 56. Illustratively, the retaining lip 54 is defined by a retaining member 58 secured to the body 16 by a U-shaped securing member 60. More particularly, the retaining member 58 is captured between the projection 29 and the securing member 60. The retaining member 58 illustratively includes a pair of opposing clips or arms 62 operably coupled by a hinge 64. Illustratively, the opposing clips 62 are biased inwardly toward each other.

The handshower 12 further includes a second magnetically attractive member 66 supported by the housing 30 and, more particularly by a rear portion 68 of the sprayhead 34. Illustratively, the second magnetically attractive member 66 may be a second magnet. Alternatively, the magnetically attractive member 66 may be a disk or washer formed of a metal (e.g., a ferrite material).

The housing 30 of the handshower 12 illustratively includes a mounting tab 70 positioned in spaced relation to (e.g., rearwardly from) the magnetically attractive member 66. Illustratively, the mounting tab 70 includes a pair of opposing arms 72 having angled surfaces 74 configured to cooperate with the clips 62 of the retaining member 58. More particularly, as the handshower 12 is docked or coupled to the mount 14, the angled surfaces 74 bias the clips 62 outwardly away from each other.

Figure 4C:
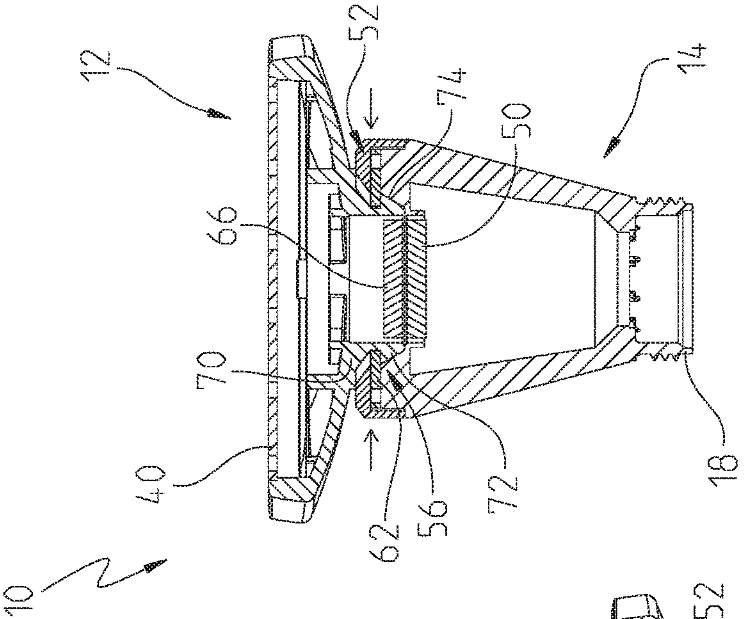
FIG. 4C is a top cross-sectional view of the shower system of FIG. 4B, shown in a docked mode with full docking or coupling of the handshower to the mount.
Figure 4B:
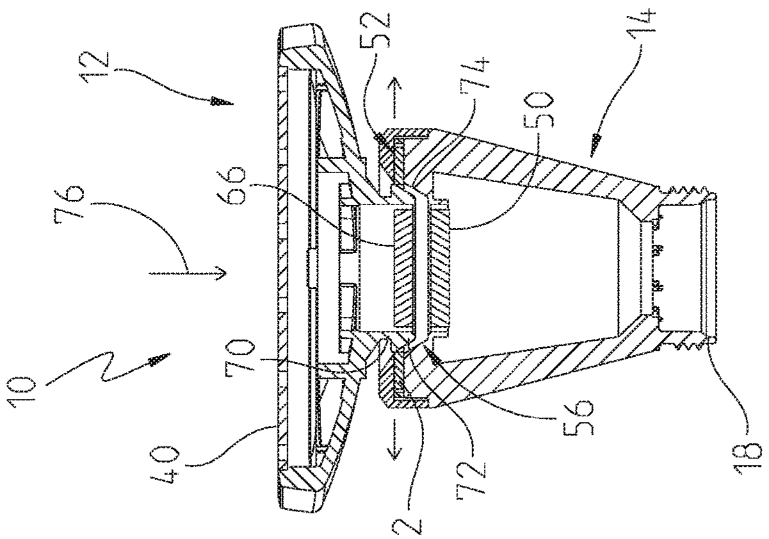
FIG. 4B is a top cross-sectional view of the shower system of FIG. 4A, showing partial docking of the handshower to the mount.
Figure 4A:
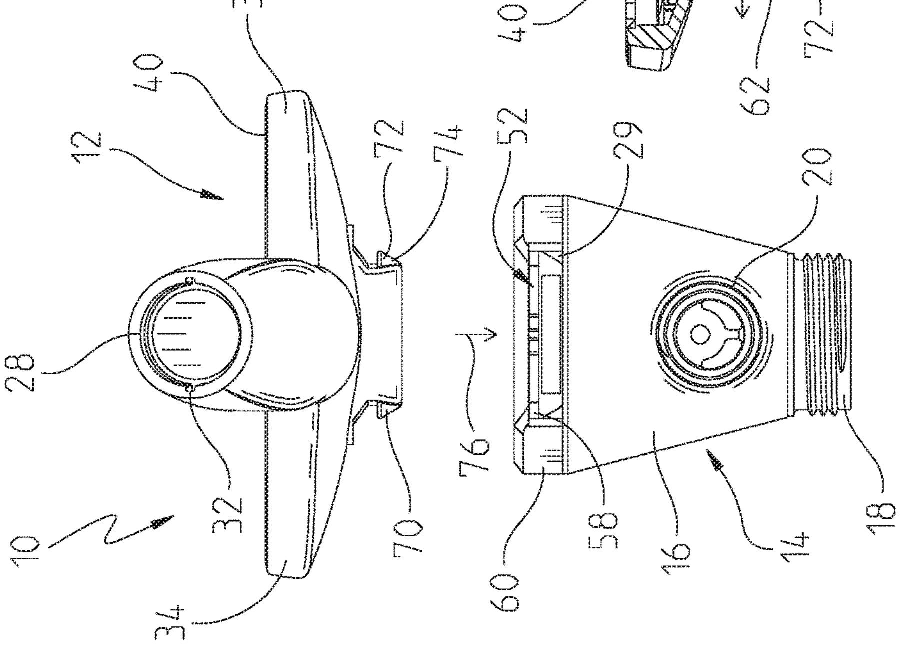
FIG. 4A is a bottom plan view of the shower system of FIG. 3, shown in an undocked mode with the handshower spaced apart from the mount.

FIGS. 3 and 4A show an undocked mode of the shower system 10, where the handshower 12 is in spaced relation to the mount 14. FIGS. 2 and 4C show a docked mode of the shower system 10, where the magnet 50 is magnetically coupled to the magnetically attractive member 66, and the mounting tab 70 is received within the retaining slot 56. FIG. 4B shows the handshower 12 moving from the undocked mode toward the docked mode (represented by arrows 76 in FIGS. 4A and 4B).

Figure 5C:
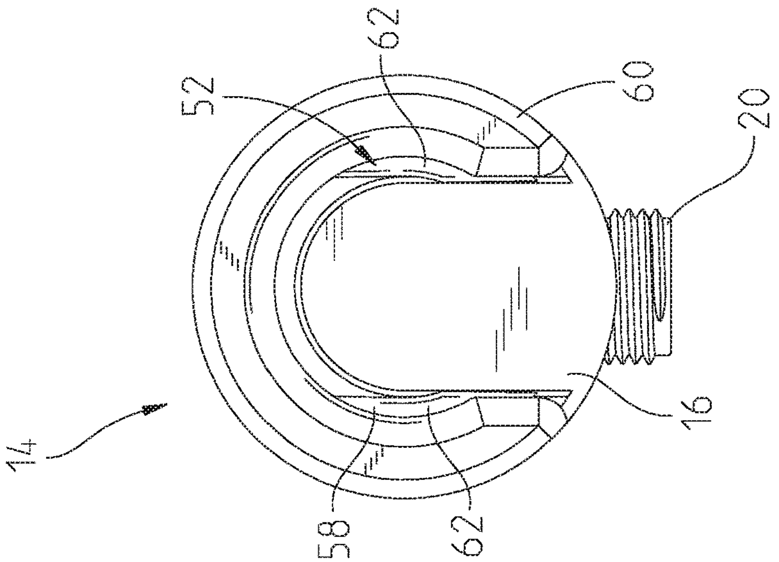
FIGS. 5A-5C are front views of the mount corresponding to the handshower positions of FIGS. 4A-4C, showing the relative orientations of the retaining clips.
Figure 5B:
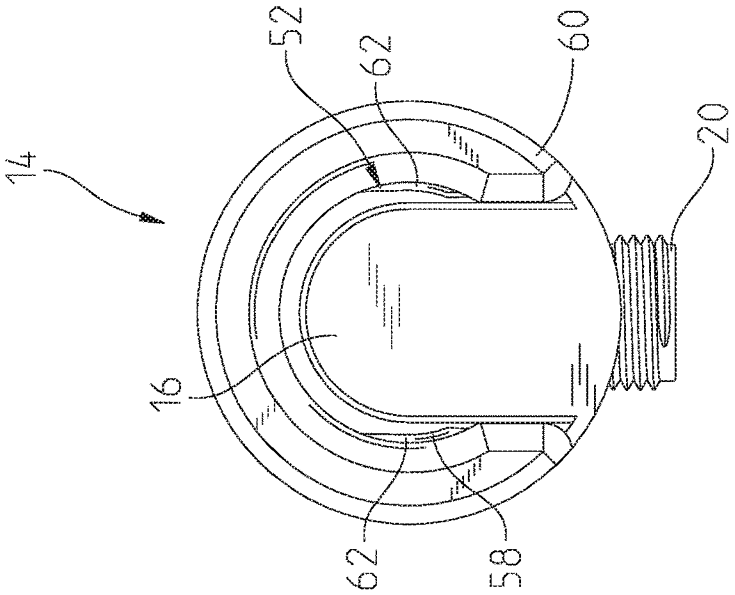
Figure 5A:
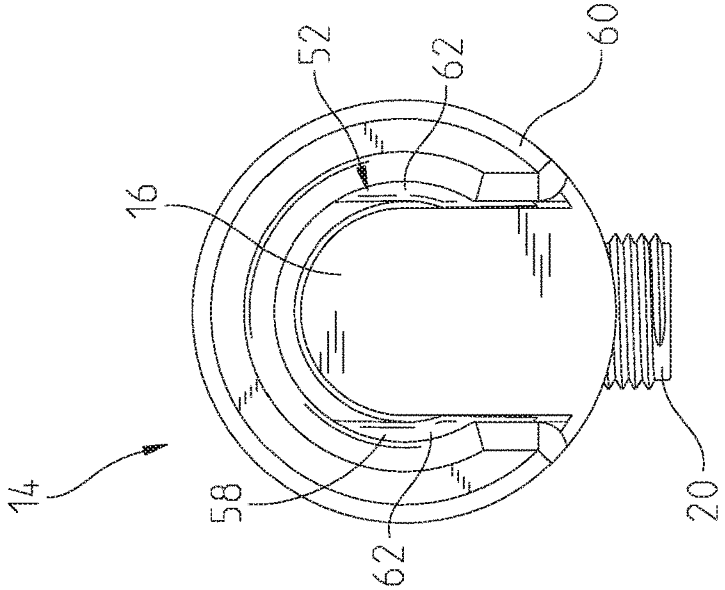

With reference to FIGS. 4A-5C, when docking the handshower 12 to the mount 14, the magnet 50 and the magnetically attractive member 66 in the handshower 12 magnetically attract each other. The angled surfaces 74 of the opposing arms 72 of the mounting tab 70 engage with the opposing clips 62 of the retaining member 58, thereby forcing the arms 72 to open away from each other. FIGS. 5A-5C are front views of the mount 14 showing positions of the clips 62 relative to the body 16 associated with FIGS. 4A-4C.

When the handshower 12 is docked to mount fully, the clips 62 will return to a resting position, resting inside of the mounting tab 70 and within the retaining slot 56. The handshower 12 is held in place on the mount 14 by magnetic force between the magnet 50 and the magnetically attractive member 66.

Figure 6C:
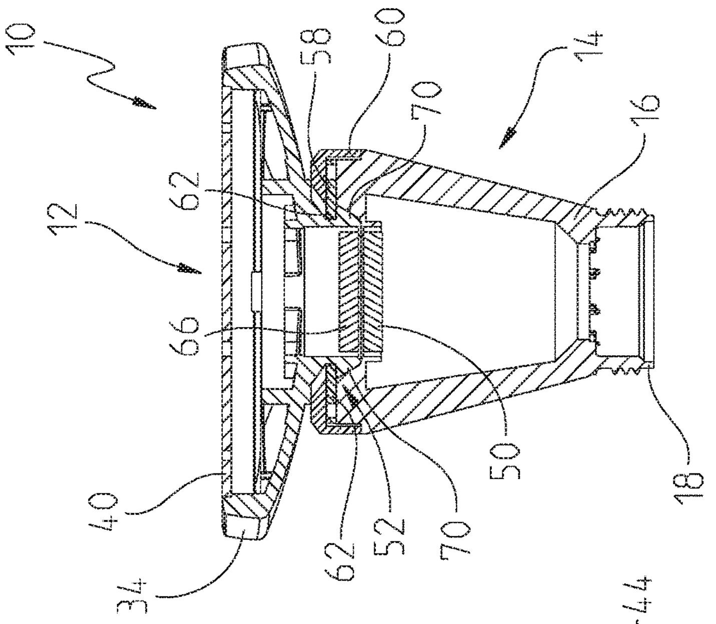
FIG. 6C is a cross-sectional view of the shower system of FIG. 6A, shown in a docked mode.
Figure 6B:
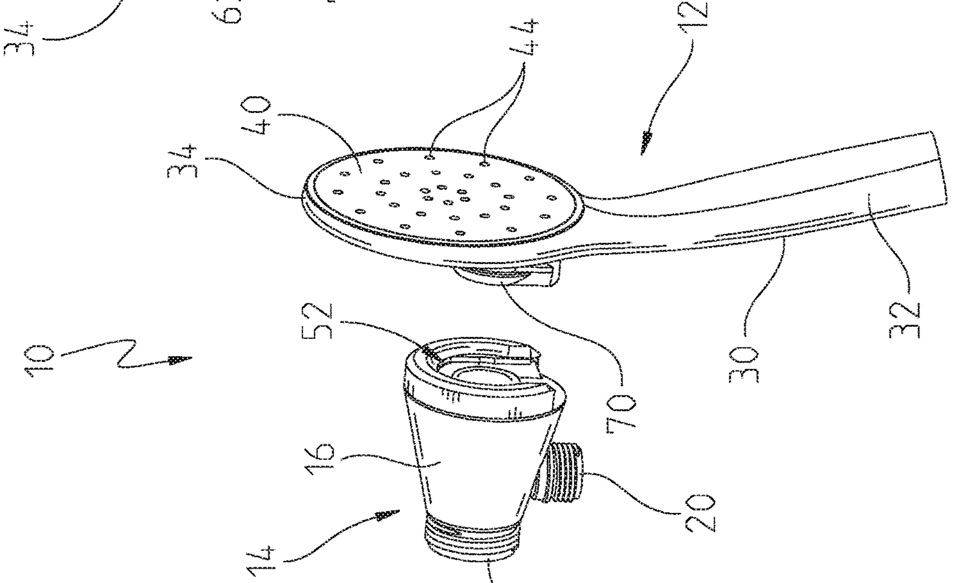
FIG. 6B is a perspective view of the shower system of FIG. 6A, shown in an undocked mode.
Figure 6A:
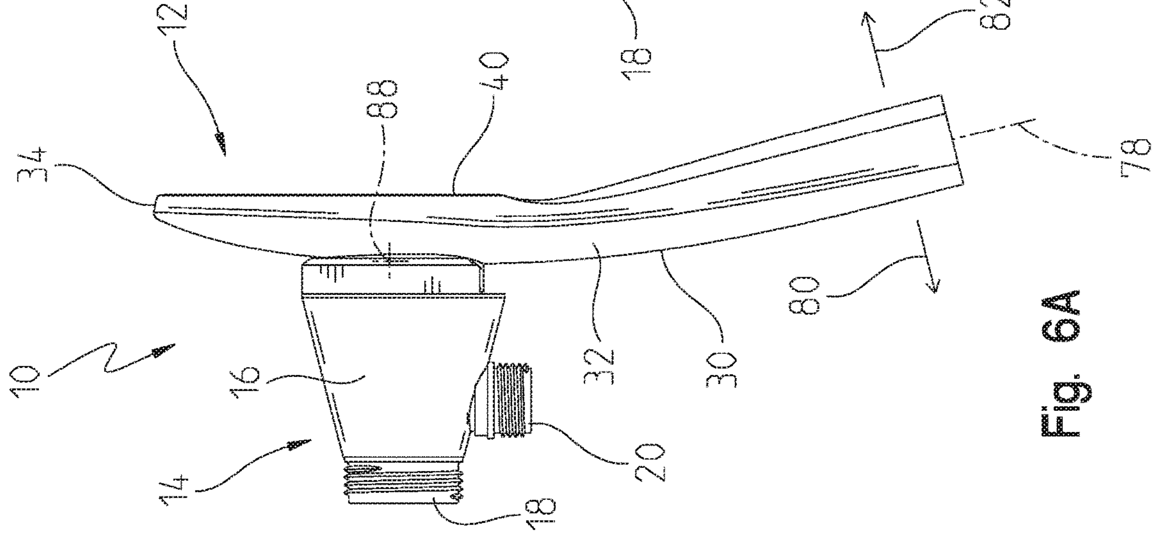
FIG. 6A is a side elevational view of the shower system of FIG. 3, shown in a docked mode.

With reference to FIGS. 6A-6C, when a force is applied normal to a longitudinal axis 78 of the handle 32 of the handshower 12 (as represented by arrows 80 and 82), the tab 70 engages with the clips 62 (and by association, the mount 14). As such, the handshower 12 engages with the mount 14 in a binding condition and does not allow for disengagement by such linear force or the moment of the handshower 12 about the mount 14.

Figures 7A, 7B, 7C:
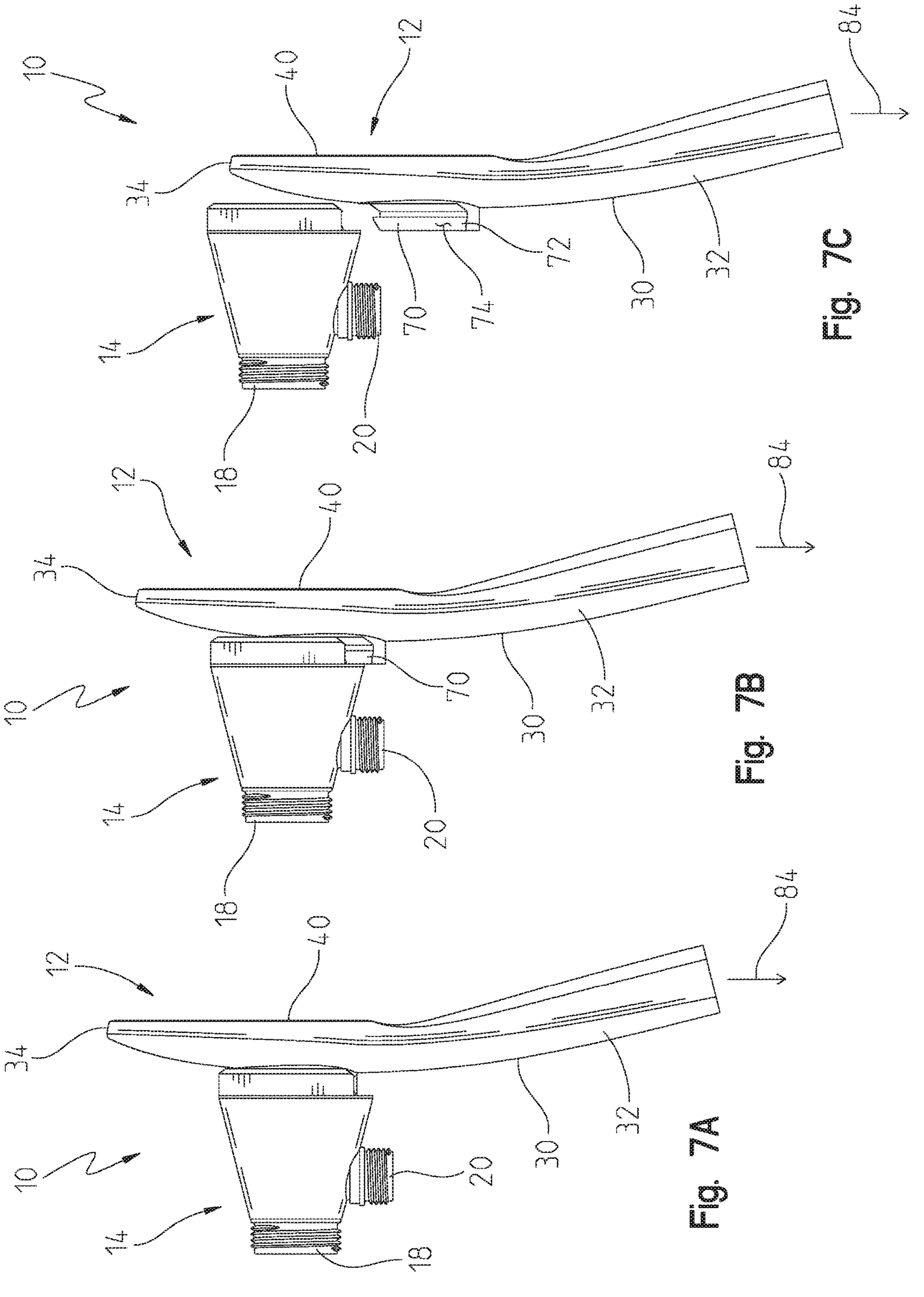
FIGS. 7A-7C are side elevational views of the shower system of FIG. 3, illustrating undocking of the handshower from the mount.

With reference now to FIGS. 7A-7C, when undocking the handshower 12 from the mount 14, the handshower 12 is pulled downwardly (as represented by arrow 84), and the opposing arms 72 of the mounting tab 70 slide down within the retaining slot 56 to release the handshower 12 from the mount 14. The tab 70 can slide down within the retaining slot 56 behind the clips 62 without loss of retention from forces normal to the handle 32 of the handshower 12.

Figure 8:
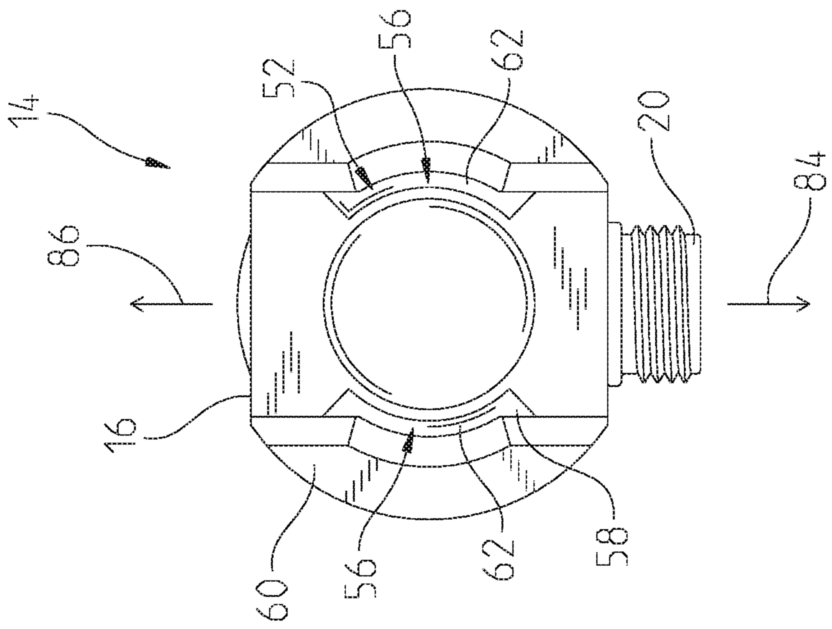
FIG. 8 is a side elevational view of a further illustrative mount of FIGS. 5A-5C.

In other illustrative embodiments as shown in FIG. 8, the handshower 12 can be pushed either downwardly or upwardly within the mount 14 (as represented by arrows 84 and 86, respectively). As such, the mounting tab 70 slides down or up within the retaining slot 56 to release the handshower 12 from the mount 14. It is noted that the retention in the plane parallel to the face of the mount 14 is strictly by magnetic force. The radial force applied by the clips 62 is designed to be minimal and only enough to return them to position, as such, if the magnet 50, 66 is removed, the handshower 12 may fall from the force of gravity. Failure to balance this force may make docking difficult as well.

The illustrative shower system 10 provides retention to prevent rotation of the magnet 66 in the handshower 12 away from the magnet 50 in the mount 14 (i.e., about a pivot axis 88 extending generally perpendicular to the longitudinal axis 78 and arrows 80, 82 in FIG. 6A). This limits the undocking of the handshower 12 from inadvertent bumps to the hose 26 which creates a large moment or lever arm.

Figure 9:
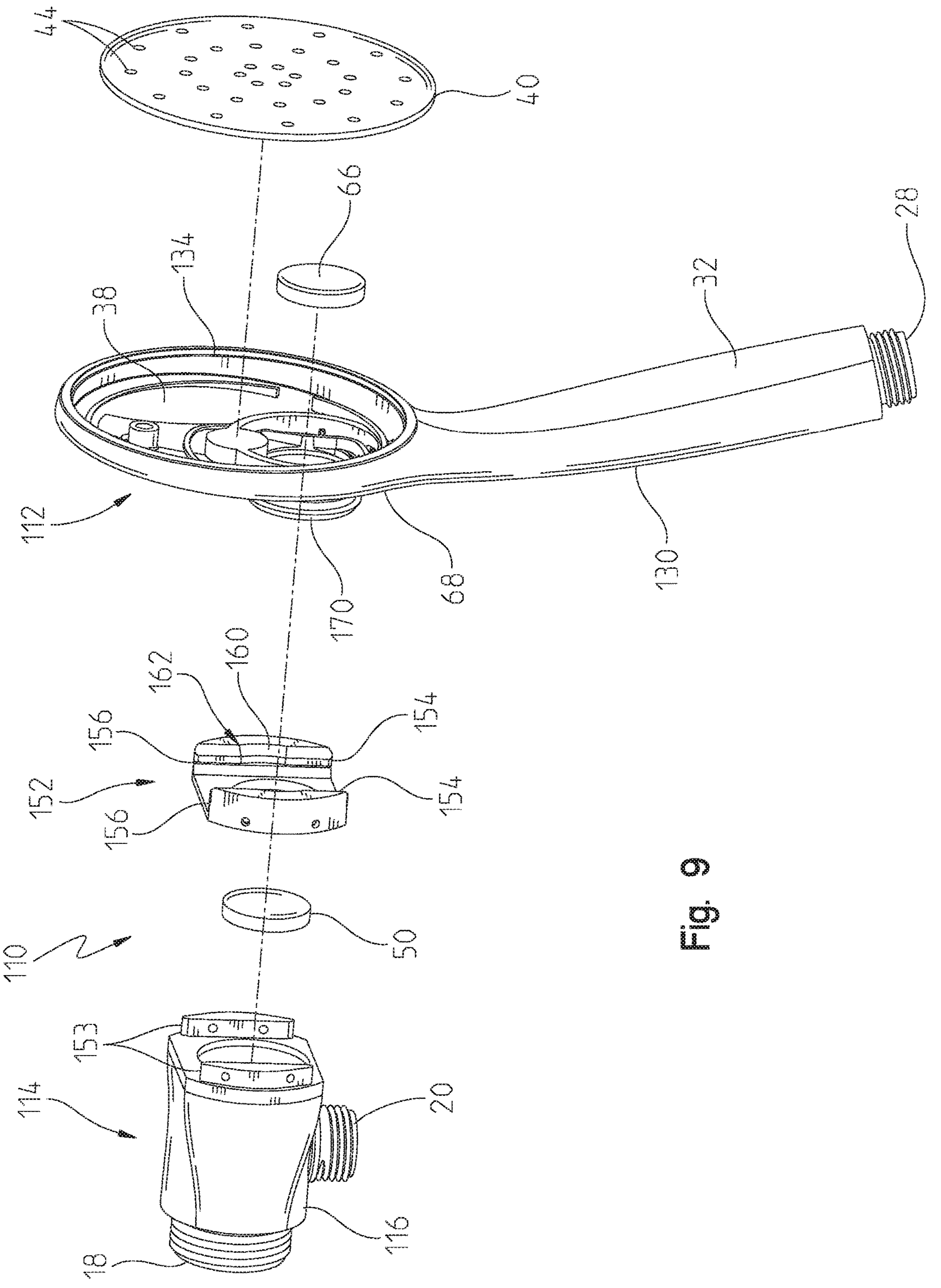
FIG. 9 is a partially exploded perspective view of a further illustrative shower system of the present disclosure.
Figure 10:
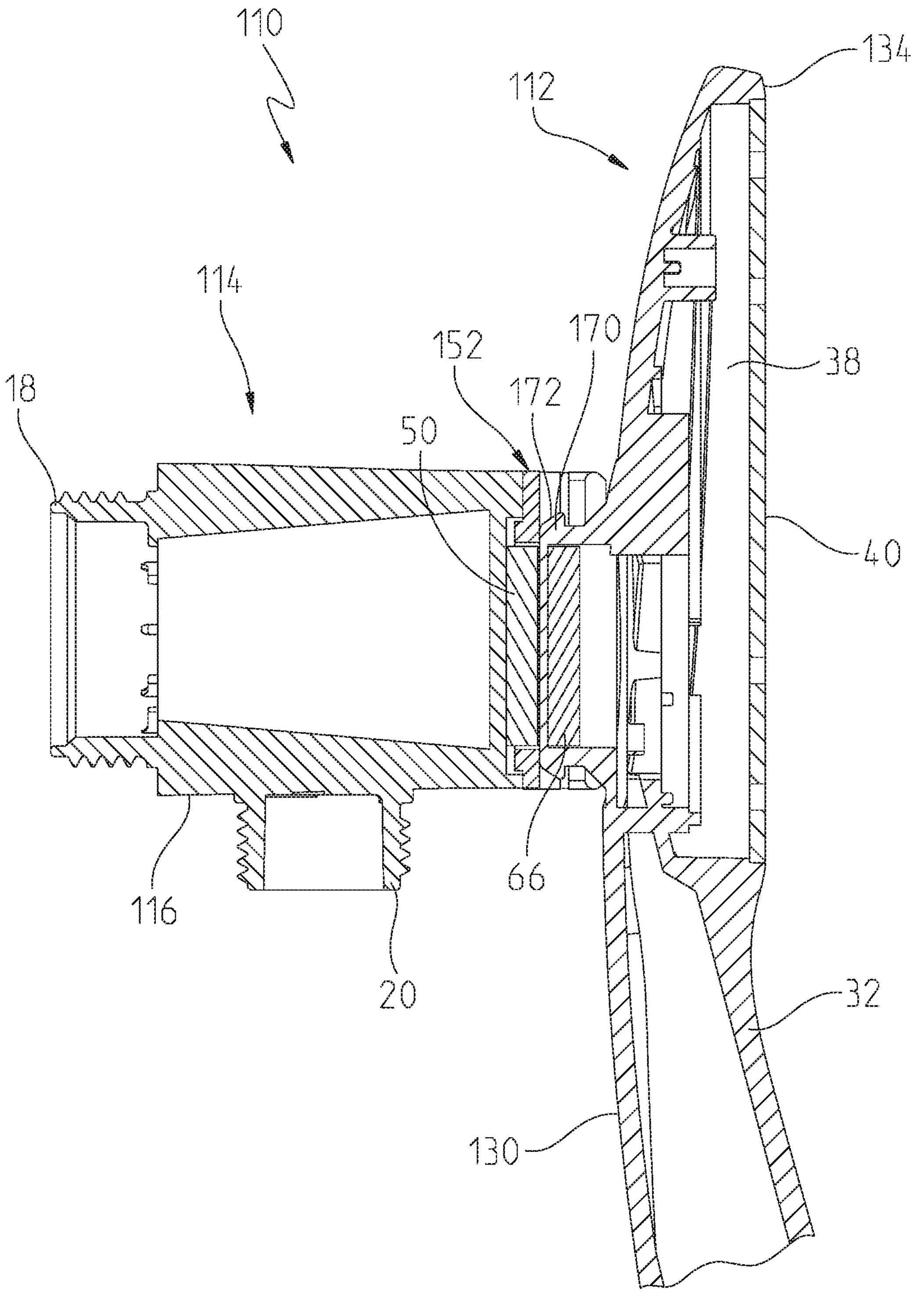
FIG. 10 is a cross-sectional view of the shower system of FIG. 9.
Figure 11:
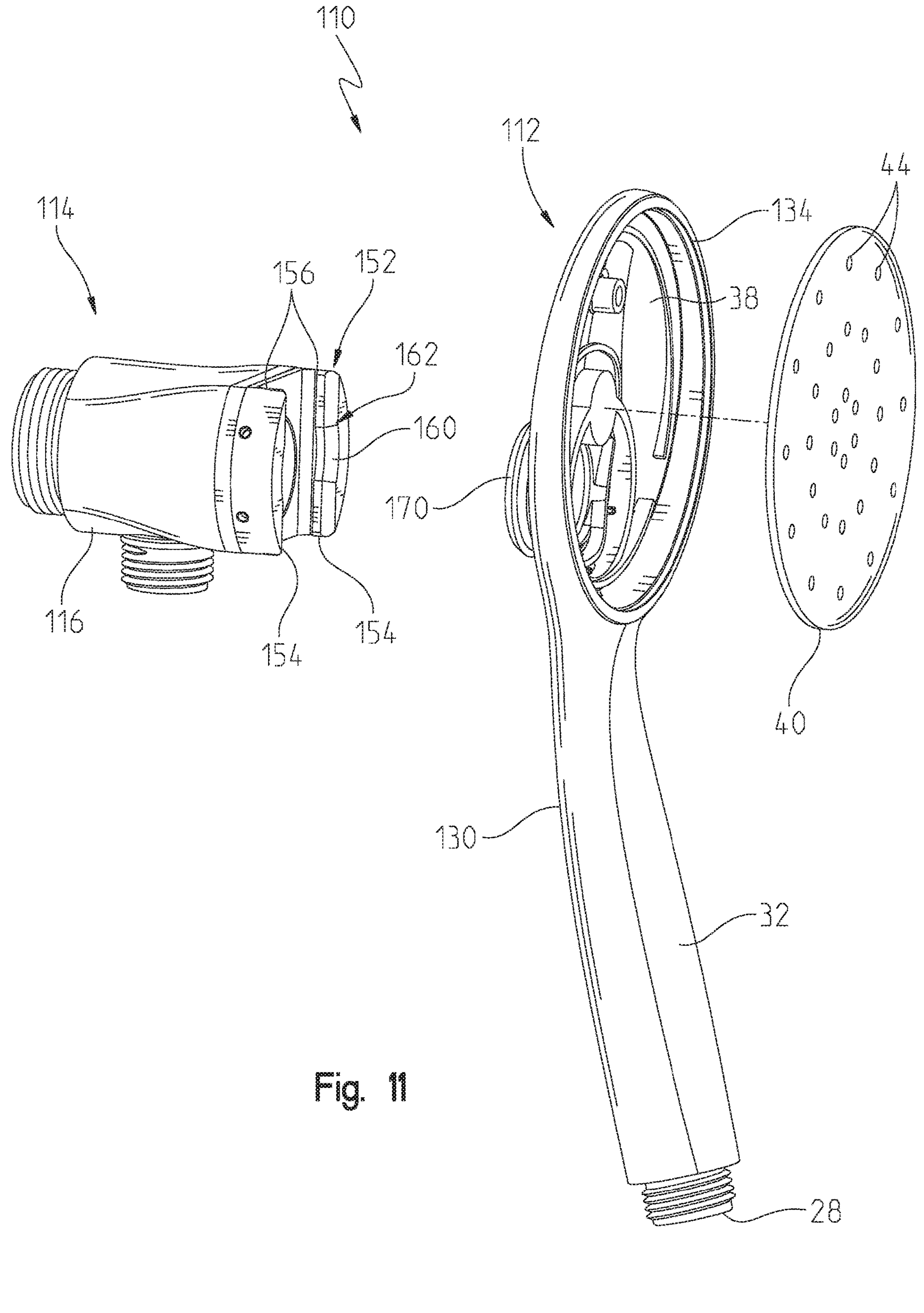
FIG. 11 is a partially exploded perspective view of the shower system of FIG. 9, showing the handshower uncoupled from the mount.

With reference now to FIGS. 9-11, a further illustrative shower system 110 includes a handheld showerhead or handshower 112 removably coupled to a mount 114. Shower system 110 includes many similar features as shower system 10. As such, in the following description, similar components will be identified with like reference numbers.

The illustrative handshower 112 includes a housing 130 having handle 32 operably coupled to a sprayhead 134. Sprayface 40 is illustratively supported by a front portion 142 of the sprayhead 134.

The mount 114 illustratively includes a body 116, a first magnetically attractive member 50 supported by a front portion of the body 116, and a retainer 152 supported by the body 116 in spaced relation to the first magnetically attractive member 50. The first magnetically attractive member 50 may comprise a first magnet. More particularly, the retainer 152 is supported by opposing projections or rails 153 at the front portion of the body 116. The retainer 152 illustratively includes a retaining lip 154 defining a retaining slot 156. Each retaining lip 154 illustratively includes a center receiving recess 160 defining a pathway or receiver 162 within the retaining slot 156 for receiving a mounting tab 170 of the handshower 112. The mounting tab 170 is illustratively defined by the housing 130 of the handshower 112 and includes an angled or tapered edge 172. In an illustrative embodiment, the receiving recess 160 is circular to receive a circular (disc shaped) mounting tab 170.

The handshower 112 further includes a magnetically attractive member 66 supported by a rear portion 68 of the sprayhead 134. Illustratively, the magnetically attractive member 66 may be a second magnet. Alternatively, the magnetically attractive member 66 may be a disk or washer formed of a metal (e.g., a ferrite material). The mounting tab 170 is illustratively positioned in spaced relation to the magnetically attracted member 66.

Figure 12:
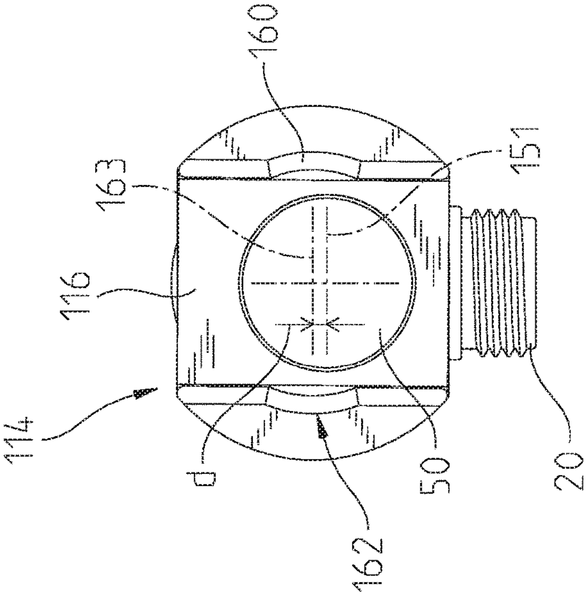
FIG. 12 is a front view of the mount of the shower system of FIG. 9, showing the offset of the entry passage to the magnet center.

As illustrated in FIG. 12, a horizontal center axis 151 of the first magnet 50 in the mount 114 is offset from a horizontal center axis 163 of the receiver 162 of the mount 114. More particularly, the entry path center axis 163 of the receiver 162 is vertically offset (by d in FIG. 12) from the center axis 151 of the magnet 50. The handshower 112 is pulled into a back surface of the mount 114, into the retaining slot 156, and centers on the magnet 50 due to the interaction of the magnetic fields. The offset (d) can be adjusted to modify this effect.

In an undocked mode, the handshower 112 is in spaced relation to the mount 114. In a docked mode, the magnet 50 is magnetically coupled to the magnetically attractive member 66, and the mounting tab 170 is received within the retaining slot 156.

Figure 13B:
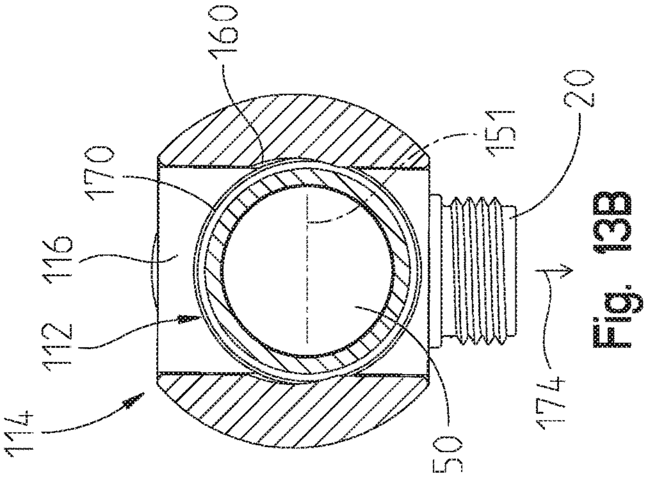
FIGS. 13A and 13B are cross-sectional views of the shower system of FIG. 9, showing the docking of a handshower to the mount.
Figure 13A:
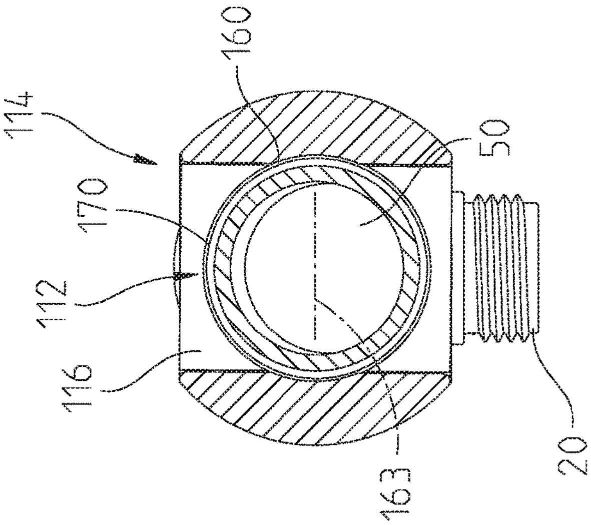

When docking the handshower 112 to the mount 114, the mounting tab 170 is aligned with the center of the receiver 162, and the magnetic coupling between the magnet 50 of the mount 114 and the magnet 66 of the handshower 112 offsets the mounting tab 170 from the center axis 163 of the receiver 162 (FIG. 13A). More particularly, after docking, the handshower tab 170 is aligned with the magnet center axis 151 by magnetic force (in the direction of arrow 174 in FIG. 13B).

Figure 14B:
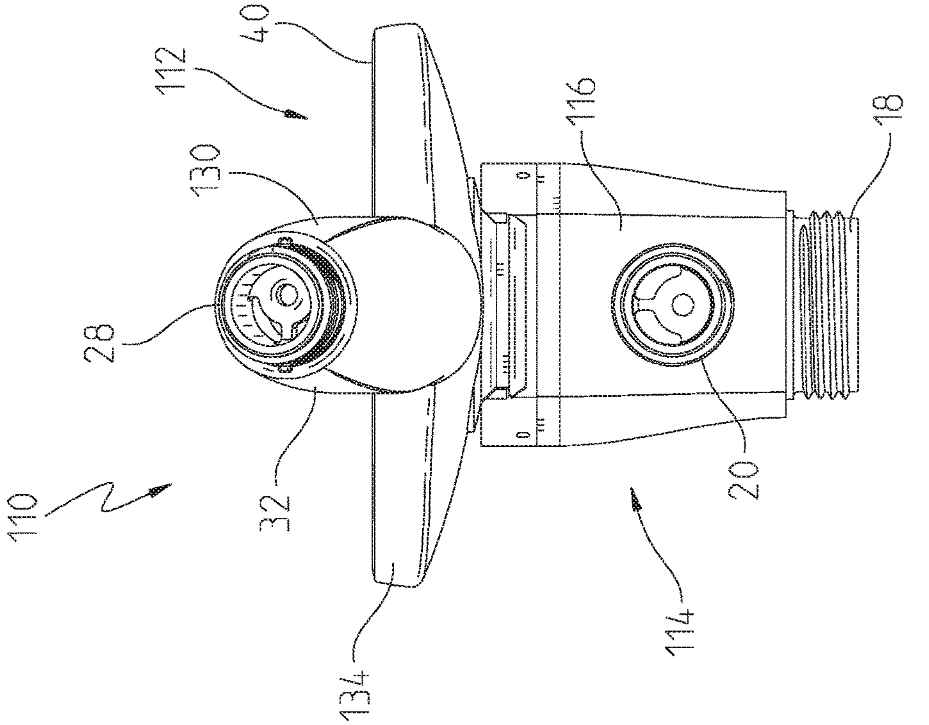
FIG. 14B is a bottom plan view of the shower system of FIG. 14A, shown in a docked mode.
Figure 14A:
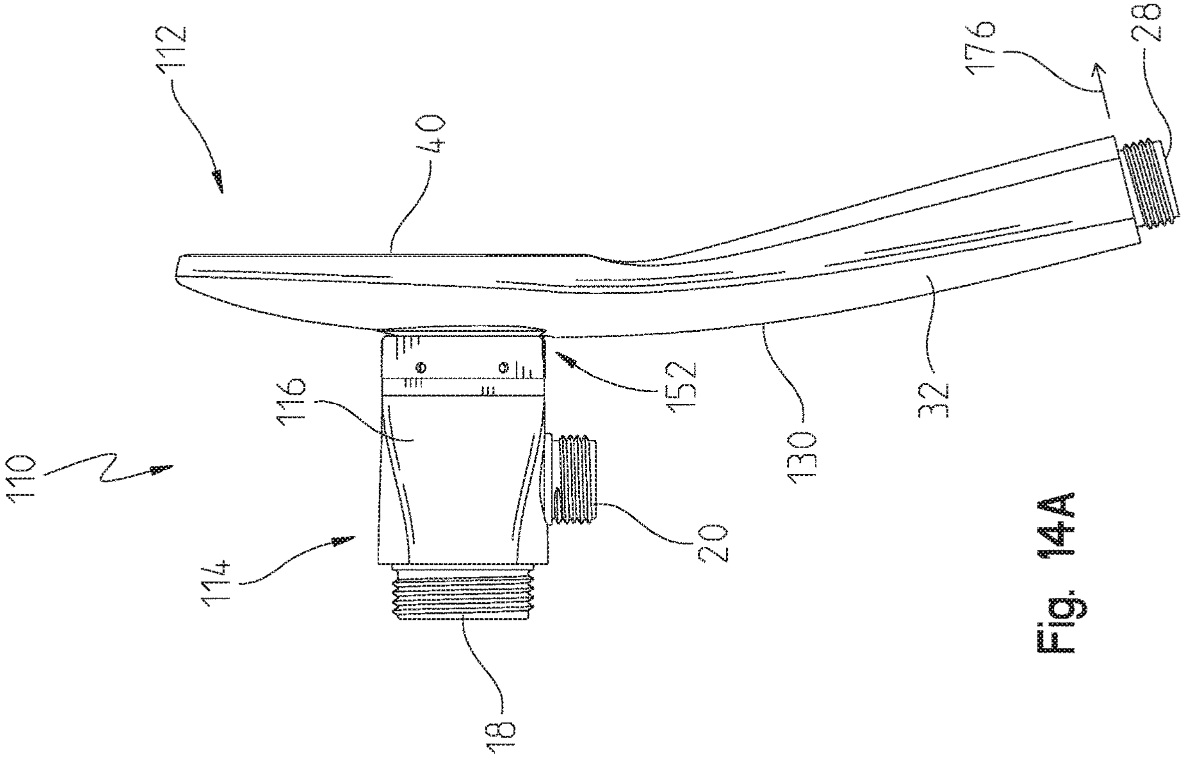
FIG. 14A is a side elevational view of the shower system of FIG. 9, shown in a docked mode.

With reference to FIGS. 14A and 14B, when docked and a force is applied normal to the handle 32 of the handshower 112 and away from the mount 114 (as shown by arrow 176 in FIG. 14A), the tab 170 engages with the retainer 152 in a binding condition and does not allow disengagement from the linear force or the moment about the mount 114. The offset (d) of the path center axis 163 to the magnet center axis 151 can be modified to adjust the intensity and strength of this effect.

Figure 16:
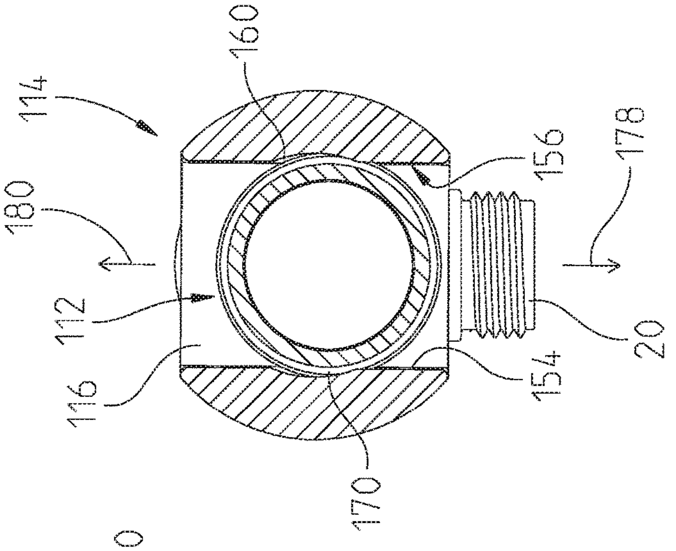
FIG. 16 is a cross-sectional view of the mount of FIG. 15A.
Figure 15B:
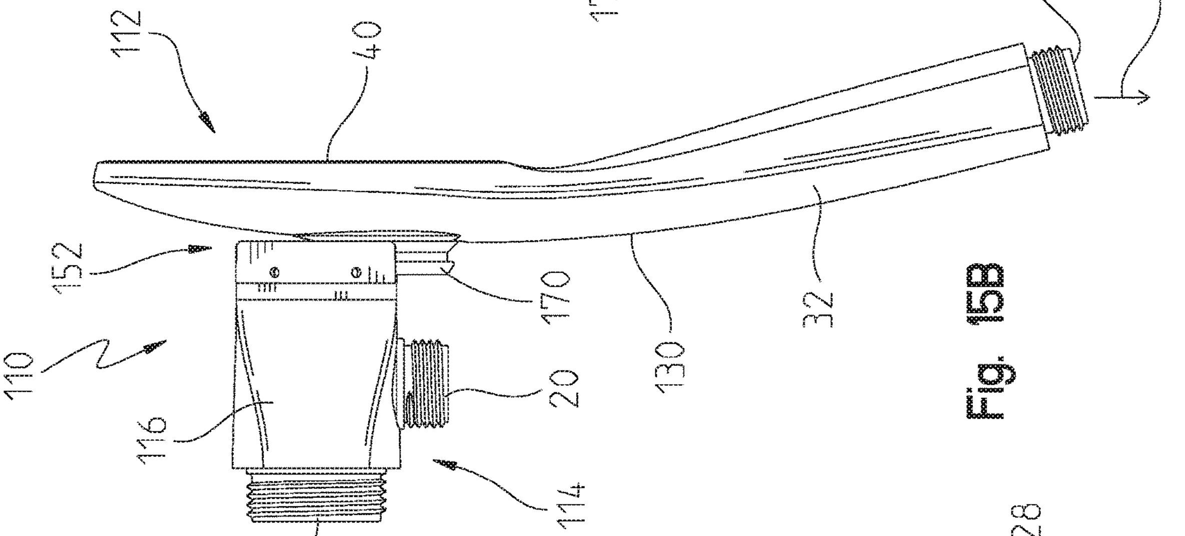
FIGS. 15A and 15B are side elevational views of the shower system of FIG. 9, illustrating undocking of the handshower from the mount.
Figure 15A:
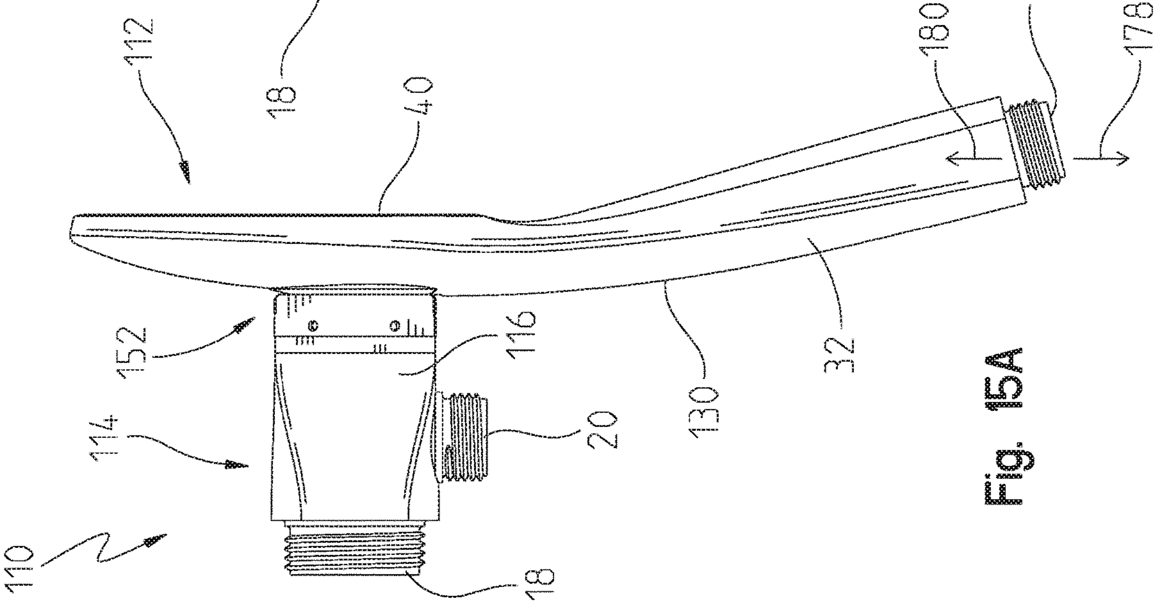
Figure 17B:
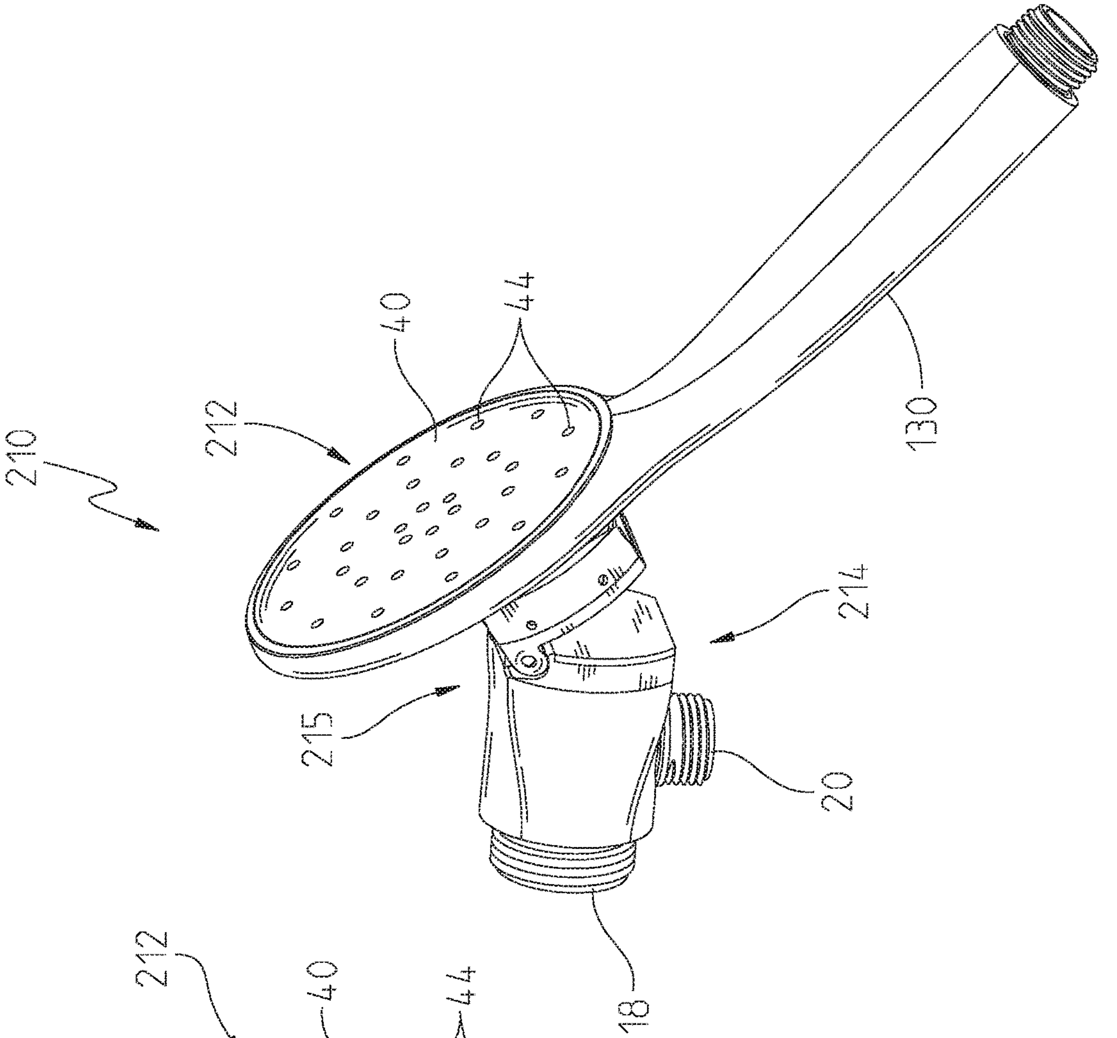
FIGS. 17A and 17B are perspective views of a further illustrative shower system including a pivot coupling between the mount and the handshower.
Figure 17A:
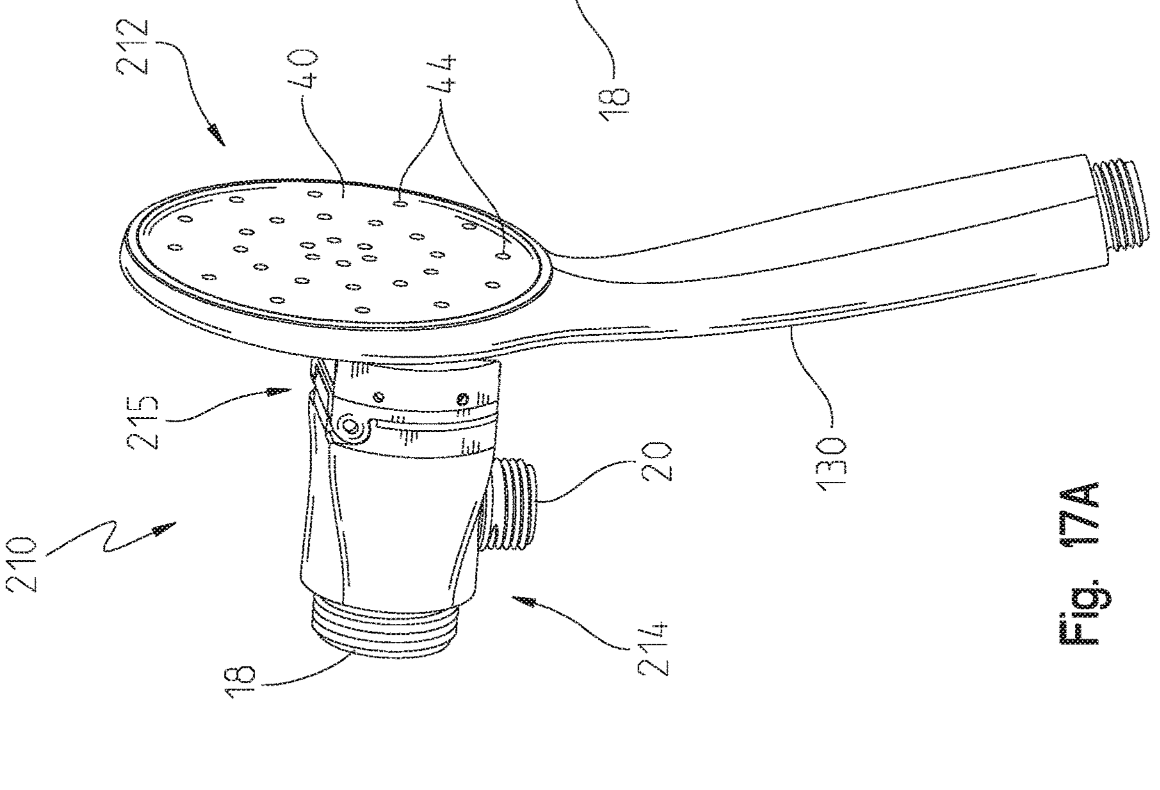
Figure 18:
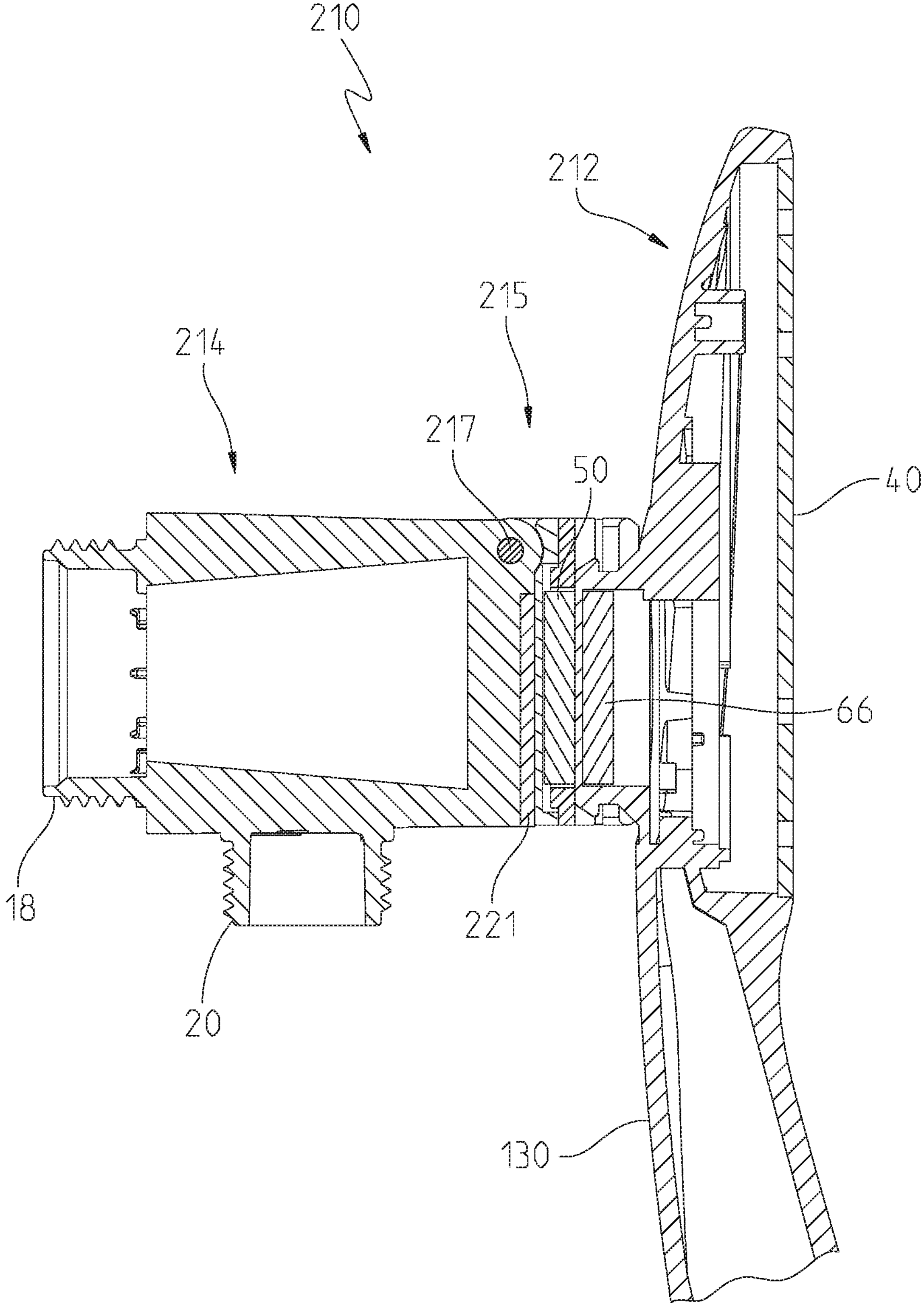
FIG. 18 is a cross-sectional view of the pivot coupling of FIGS. 17A and 17B.
Figure 19:
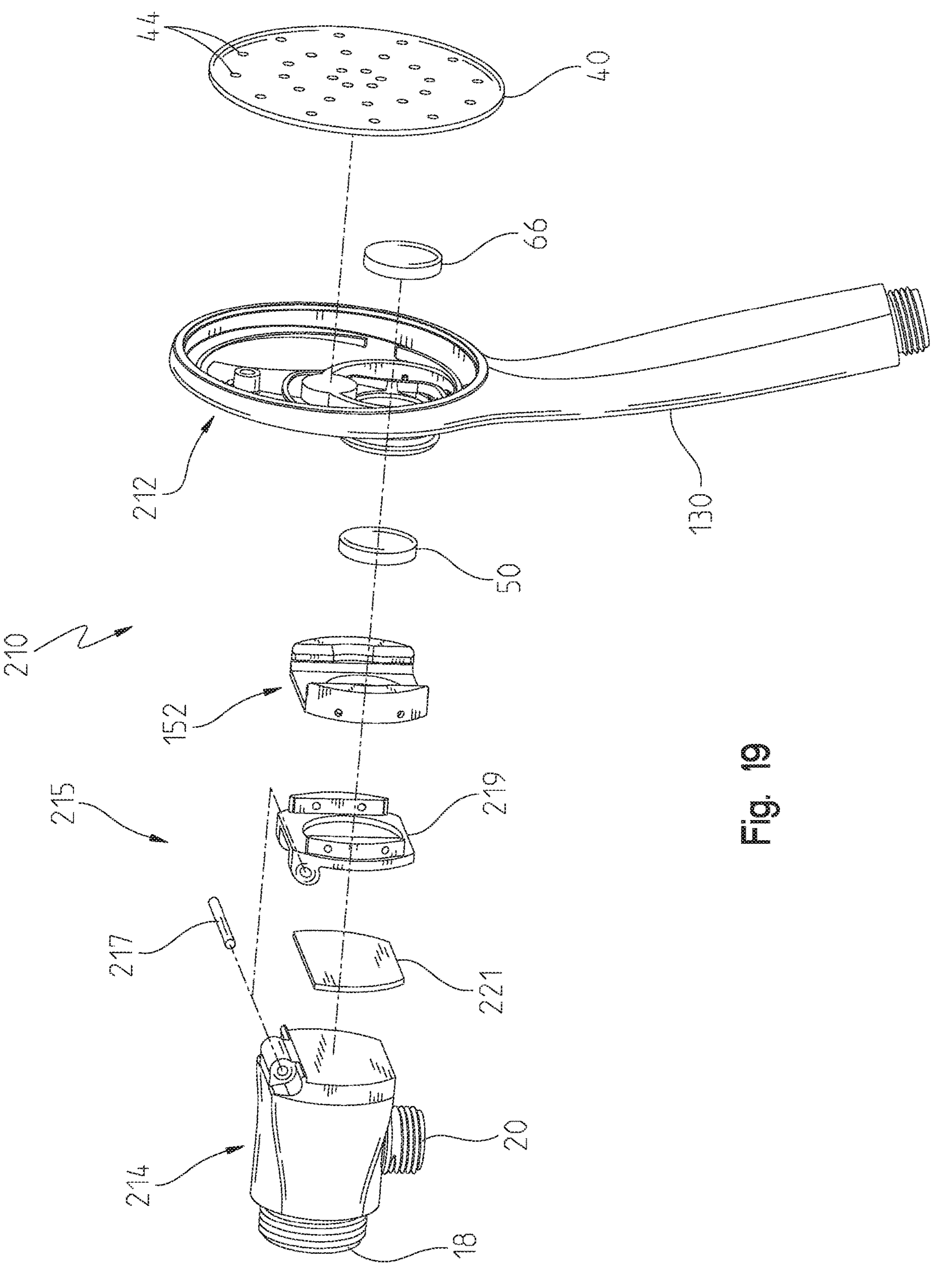
FIG. 19 is a partially exploded perspective view of the shower system of FIGS. 17A and 17B.

With reference to FIGS. 15A-16, when undocking the handshower 112 from the mount 114, the handshower 112 is pulled downwardly or pushed upwardly (as represented by arrows 178 and 180, respectively, in FIG. 15A). The mounting tab 170 slides down within the retaining slot 156 to release the handshower 112 from the mount 114. The tab 170 can slide down within the retaining slot 156 with minimal resistance. Illustratively, the cooperating structure of the mounting tab 170 and retaining lip 154 prevents undocking by pushing back on the handle 32. However, in certain illustrative embodiments, the offset (d) can by defined to permit undocking by pushing back on the handle 32.

While in the illustrative shower system 110, the cooperating magnets 50 and 66 define a biasing device to facilitate docking of the mounting tab 170 of the handshower 112 within the retaining slot 156 of the mount 114. However, other illustrative biasing devices may be substituted for, or used in combination with, the magnets 50 and 66 including, for example, springs and/or camming mechanisms.

The illustrative shower system 110 allows for easy accurate docking of the handshower 112 to a mount 114 without needing to search for a mounting feature that may be difficult to see. Additionally, the retention is such that movement down and/or up of the handshower 112 (within the retaining slot 156 of the mount 114)(as shown by arrows 178 and 180 in FIG. 16) will allow for undocking. For example, movement upwardly or downwardly and out of the retaining slot 156, or out through the pathway or receiver 162, undocks the handshower 112 from the mount 114.

With reference now to FIGS. 17A-19, a further illustrative shower system 210 includes a handheld showerhead or handshower 212 removably coupled to a mount 214. Shower system 210 includes many similar features as shower systems 10 and 110. As such, in the following description, similar components will be identified with like reference numbers.

The illustrative mount 214 includes a pivot coupling 215 between the body and the magnet. The pivot coupling 215 allows for easy use of the shower system 210. More particularly, the pivot coupling 215 may be biased to return the handshower 212 to a vertical (or parallel) orientation. The pivot coupling 215 illustratively includes a hinge pin 217 operably coupled to a hinge member 219. Biasing may be provided by a conventional device, such a spring (not shown). Alternatively, a magnetically attractive element 221, such as a ferritic plate, may be magnetically attracted to the magnet to bias the handshower 212 to its rest position.

The illustrative shower system 210 may include magnets having reduced strength, since the handshower 212 is not solely retained in every degree of freedom by the magnets (i.e., excluding rotation about the magnet axis, this degree of freedom is not restricted). Further, the cost of the structure is less as an alternating polarity magnet array is not required and, as such, allows for easy undocking due to the direction of the undocking.

Figure 20:
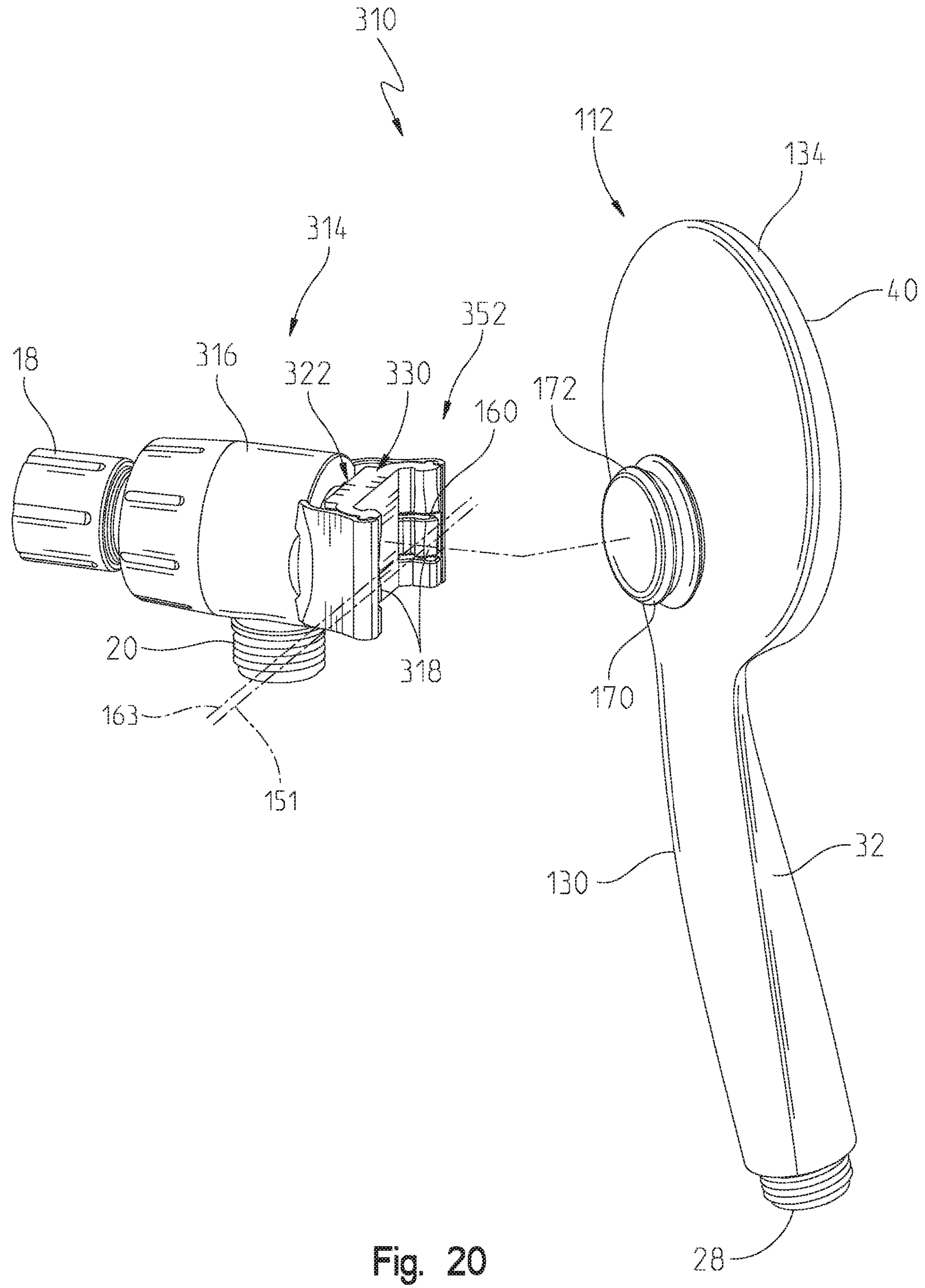
FIG. 20 is an exploded perspective view of a further illustrative shower system of the present disclosure.
Figures 21A, 21B, 21C:
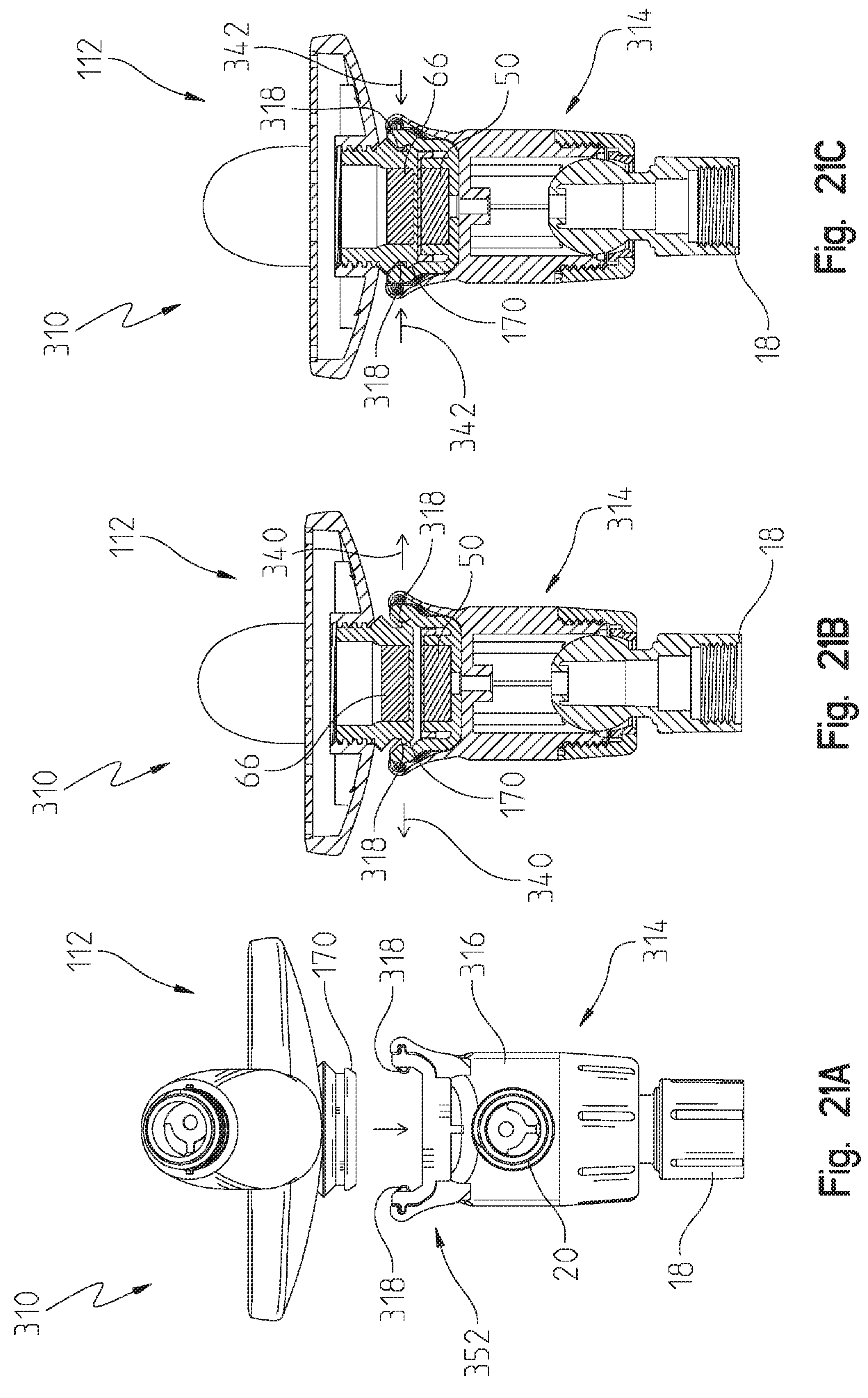
FIG. 21A is a bottom plan view of the shower system of FIG. 20, shown in an undocked mode with the handshower spaced apart from the mount.
FIGS. 21B and 21C are bottom cross-sectional views, showing the docking of the handshower to the mount.
Figure 22:
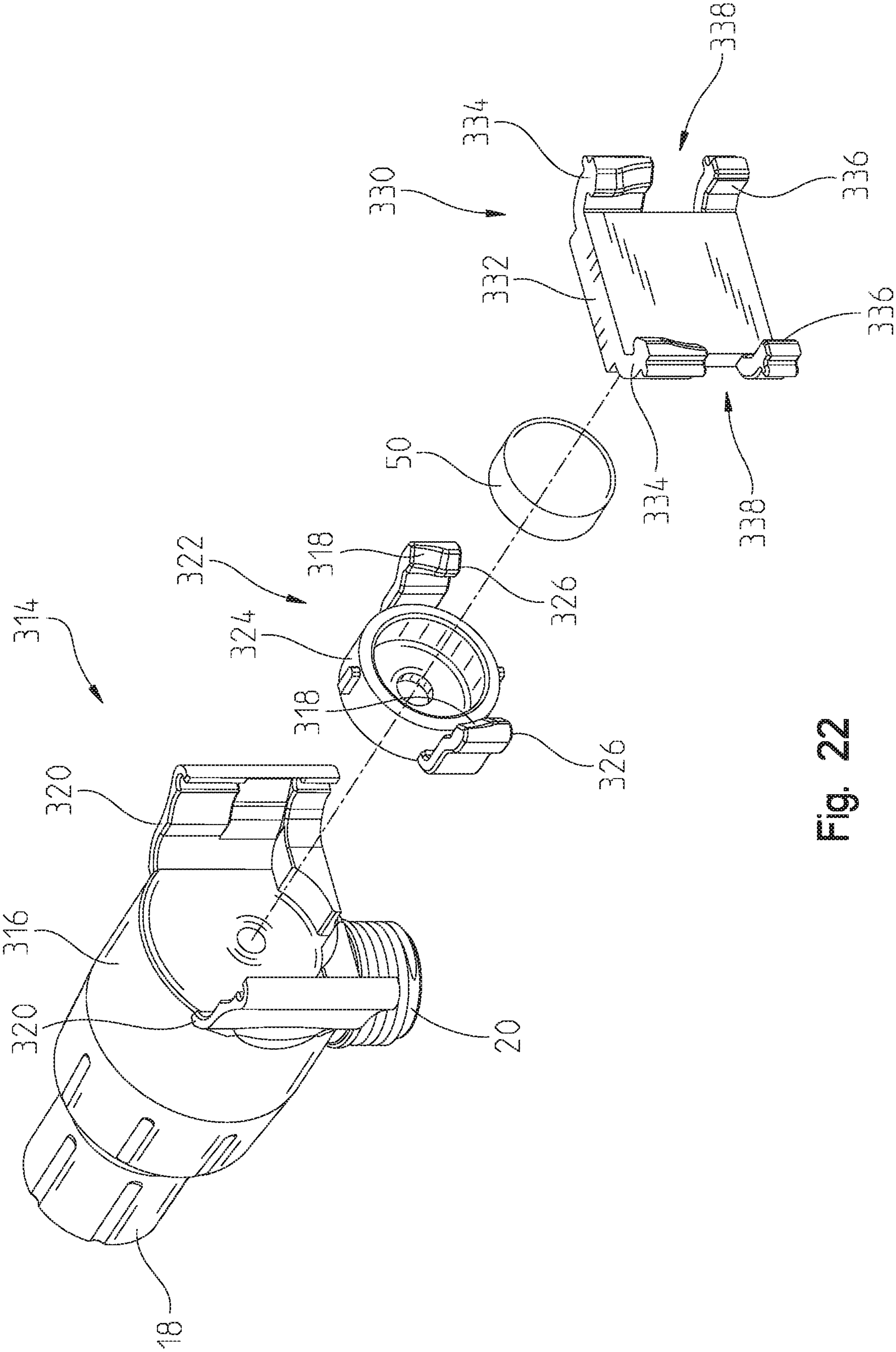
FIG. 22 is an exploded perspective view of the mount of the shower system of FIG. 20.

With reference now to FIGS. 20-22, a further illustrative shower system 310 includes handheld showerhead or handshower 112 removably coupled to a mount 314. Shower system 310 includes many similar features as shower systems 10, 110 and 210. As such, in the following description, similar components will be identified with like reference numbers.

Figure 13C:
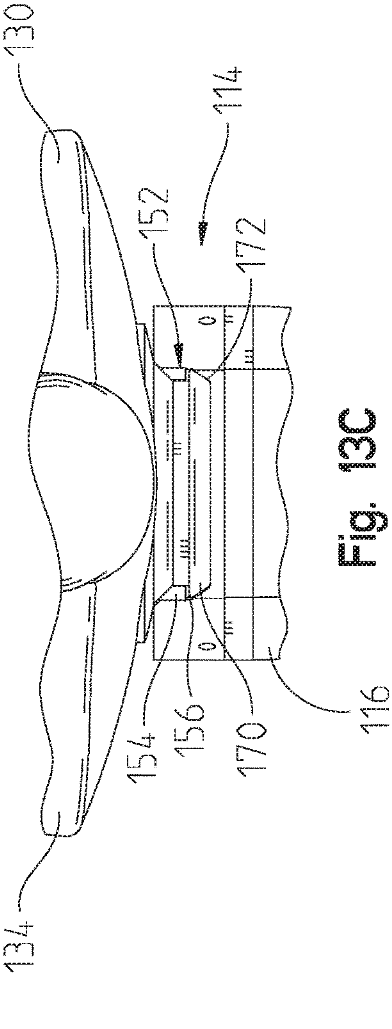
FIG. 13C is a bottom plan view of the shower system of FIG. 9, shown in a docked mode with full docking or coupling of the handshower to the mount.

The mount 314 illustratively includes a magnetic coupling arrangement similar to mount 114 as shown in FIGS. 12-13C, wherein a mount body 316 supports a receiving recess 160 opposite the water inlet 18 (i.e., at the front portion of the mount body 316). However, the recess 160 of mount 314 includes flexible portions 318 such that rotation of the handshower 112 (as shown by arrow 176 in FIG. 14) for removal of the handshower 112 from the mount 314 may occur.

More particularly, the mount body 316 illustratively includes opposing arms 320 configured to receive a holder 322. The holder 322 includes a cup 324 for receiving the first magnet 50. Opposing arms 326 are extend outwardly from the cup 324 and support the flexible portions 318. Illustratively, the flexible portions 318 comprise a resilient material, such as an elastomer. In other illustrative embodiments, the flexible portions 318 may comprise spring biased tabs. While the opposing arms 320 of the mount body 316, the holder 322 and the retainer 330 are shown as separate components, it should be appreciated that some of all of these components could be combined.

A retainer 330 is coupled to the holder 322 such that the first magnet 50 is received within the cup 324 and covered by a base 332 of the holder 322. Opposing arms 334 and 336 extend outwardly from the base 332. The arms 334 and 336 are vertically spaced apart by gaps 338. The flexible portions 318 are received within the gaps 338. The arms 334 and the flexible portions 318 define the opposing receiving recesses 160, lips 354 and slots 356.

FIG. 21A is a bottom plan view of the shower system 310 showing the handshower 112 undocked from the mount 314. FIG. 21B is a bottom cross-sectional views of the shower system 310 showing the docking of the handshower 112 to the mount 314, where the flexible portions 318 of the mount 314 may move be forced away from each other by the mounting tab 170 of the handshower 112 (as shown by arrows 340). FIG. 21C is a view similar to FIG. 21B showing the flexible portions 318 of the mount 314 being biased inwardly toward each other to capture the mounting tab 170 of the handshower 112 (as shown by arrows 342).

Although the invention has been described in detail with reference to certain preferred embodiments, variations and modifications exist within the spirit and scope of the invention as described and defined in the following claims.

The invention claimed is:

1. A shower system comprising:

a mount including a body, and a magnet supported by the body;

a handshower including a housing, a sprayface supported by a front portion of the housing, and a magnetically attractive member supported by a rear portion of the housing;

a retainer supported by one of the body of the mount and the housing of the handshower, the retainer having a retaining lip defining a retaining slot, wherein the retaining lip is defined by a pair of opposing clips;

a mounting tab supported by the other one of the housing of the handshower and the body of the mount, wherein the mounting tab includes a pair of opposing arms having angled surfaces configured to bias the opposing clips outwardly away from each other;

wherein the handshower is in spaced relation to the mount in an undocked mode; and wherein the magnet is magnetically coupled to the magnetically attractive member, and the mounting tab is received within the retaining slot in a docked mode.

2. The shower system of claim 1, wherein, when docking the handshower to the mount, the magnet in the mount and the magnetically attractive member in the handshower magnetically attract each another, and the angled surfaces of the opposing arms of the mounting tab engage with the opposing clips of the retaining lip.

3. The shower system of claim 2, wherein when undocking the handshower from the mount, the handshower is pulled downwardly, and the opposing arms of the mounting tab slide down within the retaining slot to release the handshower from the mount.

4. The shower system of claim 1, wherein the opposing clips are operably couped by a hinge.

5. The shower system of claim 1, wherein:
the retainer is supported by a front portion of the body of the mount in spaced relation to the magnet; and
the mounting tab is supported by the rear portion of the housing of the handshower in spaced relation to the magnetically attractive member.

6. A shower system comprising:
a mount including a body;
a handshower including a housing, and a sprayface supported by a front portion of the housing;
a magnetic coupling including a magnet supported by one of the body of the mount and the housing of the handshower, and a magnetically attractive member supported by the other of the housing of the handshower and the body of the mount;
a retaining device including a retainer supported by one of the mount and the handshower, the retainer having a retaining lip defining a retaining slot, and a mounting tab supported by the other of the handshower and the mount;
wherein the handshower is in spaced relation to the mount in an undocked mode;
wherein the magnet is magnetically coupled to the magnetically attractive member, and the mounting tab is received within the retaining slot in a docked mode;
the retaining lip is defined by a pair of opposing clips; and
the mounting tab includes a pair of opposing arms.

7. The shower system of claim 6, wherein the pair of opposing arms include angled surfaces configured to bias the opposing clips outwardly away from each other.

8. The shower system of claim 7, wherein, when docking the handshower to the mount, the magnet and the magnetically attractive member magnetically attract each another, and the angled surfaces of the opposing arms of the mounting tab engage with the opposing clips of the retaining lip.

9. The shower system of claim 6, wherein the magnetically attractive element comprises a magnet.

10. The shower system of claim 6, wherein:
the retaining lip includes a recess to define a receiver to receive the mounting tab;
the magnetically attractive member comprises a magnet; and
a center of the magnet is offset from a center of the receiver.

11. The shower system of claim 6, wherein the mount further includes a pivot coupling between the body and the magnet.

12. The shower system of claim 11, further comprising a biasing member configured to biased the magnet toward the mount.

13. The shower system of claim 12, wherein the biasing member comprises magnetically attractive member.

* * * * *